United States Patent
Yamaguchi et al.

(10) Patent No.: US 12,053,914 B2
(45) Date of Patent: Aug. 6, 2024

(54) METHOD OF MANUFACTURING COMPOSITE MEMBER AND THE COMPOSITE MEMBER

(71) Applicants: SINTOKOGIO, LTD., Nagoya (JP); Shibaura Institute of Technology, Tokyo (JP)

(72) Inventors: Eiji Yamaguchi, Toyokawa (JP); Nayuta Horie, Toyokawa (JP); Yuuka Ito, Toyokawa (JP); Ai Serizawa, Tokyo (JP); Takahiro Ishizaki, Tokyo (JP)

(73) Assignees: SINTOKOGIO, LTD., Nagoya (JP); Shibaura Institute of Technology, Tokyo (JP)

( * ) Notice: Subject to any disclaimer, the term of this patent is extended or adjusted under 35 U.S.C. 154(b) by 214 days.

(21) Appl. No.: 17/172,452

(22) Filed: Feb. 10, 2021

(65) Prior Publication Data
US 2021/0299923 A1 Sep. 30, 2021

(30) Foreign Application Priority Data
Mar. 24, 2020 (JP) .................. 2020-053199

(51) Int. Cl.
*B29C 45/14* (2006.01)
*B29K 705/02* (2006.01)
*B32B 15/08* (2006.01)

(52) U.S. Cl.
CPC ........ *B29C 45/14311* (2013.01); *B32B 15/08* (2013.01); *B29C 2045/14868* (2013.01); *B29K 2705/02* (2013.01); *B29K 2995/0005* (2013.01)

(58) Field of Classification Search
CPC ............... B29C 45/14; B29C 45/14311; B29C 45/1657; B29C 2045/14868; B29K 2705/02; B29K 2995/0005
See application file for complete search history.

(56) References Cited

U.S. PATENT DOCUMENTS

| | | | | |
|---|---|---|---|---|
| 4,223,074 A | * | 9/1980 | Yoshida | B32B 38/0008 156/273.5 |
| 11,059,207 B2 | * | 7/2021 | Kajihara | B32B 9/005 |

FOREIGN PATENT DOCUMENTS

| | | | | |
|---|---|---|---|---|
| JP | H02-058887 A | | 2/1990 | |
| JP | H0258887 A | * | 2/1990 | ............... H05K 1/05 |

(Continued)

OTHER PUBLICATIONS

R.U. Din, "Accelerated growth of oxide film on aluminium alloys under steam: Part I: Effects of alloy chemistry and steam vapour pressure on microstructure," Surface & Coatings Technology 276 (2015) 77-88. (Year: 2015).*

(Continued)

*Primary Examiner* — William P Fletcher, III
(74) *Attorney, Agent, or Firm* — Faegre Drinker Biddle & Reath LLP

(57) ABSTRACT

A method of manufacturing a composite member including an aluminum member and a resin member that are bonded to each other, the method including: performing blasting on a surface of the aluminum member; modifying the surface of the aluminum member into aluminum hydroxide, the modifying including causing the surface of the aluminum member having undergone blasting to react with water vapor by applying a pressure exceeding an atmospheric pressure; and directly bonding the resin member to the surface of the aluminum member modified to aluminum hydroxide.

4 Claims, 17 Drawing Sheets

(56) References Cited

FOREIGN PATENT DOCUMENTS

| | | | |
|---|---|---|---|
| JP | 2003-237003 A | 8/2003 | |
| JP | 2008-207547 A | 9/2008 | |
| JP | 2011121306 A * | 6/2011 | ....... B29C 45/14311 |
| JP | 2017-218615 A | 12/2017 | |
| JP | 2019-217716 A | 12/2019 | |
| WO | WO-2017/141381 A1 | 8/2017 | |
| WO | WO-2017141381 A1 * | 8/2017 | ....... B29C 45/14311 |

OTHER PUBLICATIONS

R.U. Din, "Accelerated growth of oxide film on aluminium alloys under steam: Part II: Effects of alloy chemistry and steam vapour pressure on corrosion and adhesion performance," Surface & Coatings Technology 276 (2015) 106-115. (Year: 2015).*

Din, R. U., Yuksel, S., Jellesen, M. S., Møller, P., & Ambat, R. (2013). Steam Assisted Accelerated Growth of Oxide Layer on Aluminium Alloys. In Proceedings of Eurocorr 2013 European Federation of Corrosion. (Year: 2013).*

Rafferty, John P. "Why Are Some Metals More Conductive than Others?". Encyclopedia Britannica, Apr. 15, 2022, https:// www.britannica.com/story/why-are-some-metals-more-conductive-than-others. Accessed Dec. 27, 2023. (Year: 2022).*

Japanese Office Action issued May 9, 2023 in Application No. 2020-053199.

* cited by examiner

Fig.16

| | Example 1 | Example 2 | Example 3 | Example 4 | Example 5 | Example 6 | Example 7 |
|---|---|---|---|---|---|---|---|
| Blasting step | ○ | ○ | ○ | ○ | ○ | ○ | ○ |
| Arithmetic mean inclination | A | A | A | A | B | A | A |
| Surface hydroxylation step | ○ | ○ | ○ | ○ | ○ | ○ | ○ |
| Heating temperature (°C) | 180 | 180 | 180 | 180 | 180 | 140 | 220 |
| Treatment time (h) | 2 | 3 | 6 | 24 | 6 | 6 | 6 |
| Shearing strength (MPa) | 21 | 30 | 38 | 26 | 13 | 30 | 35 |

| | Comparative example 1 | Comparative example 2 | Comparative example 3 | Comparative example 4 | Comparative example 5 | Comparative example 6 |
|---|---|---|---|---|---|---|
| Blasting step | × | ○ | ○ | × | × | × |
| Arithmetic mean inclination | — | A | B | — | — | — |
| Surface hydroxylation step | × | × | × | ○ | ○ | ○ |
| Heating temperature (°C) | — | — | — | 140 | 180 | 220 |
| Treatment time (h) | — | — | — | 24 | 24 | 24 |
| Shearing strength (MPa) | 1 | 15 | 11 | 7.2 | 9.9 | 3.9 |

*1 ··· ○ indicates "done", × indicates "not done", and — indicates "no value"
*2 ··· A indicates that abrasive grains have a particle size of 106 μm to 125 μm and a blast pressure is 1.0 Mpa in blasting
*3 ··· B indicates that abrasive grains have a particle size of 106 μm to 125 μm and a blast pressure is 0.4 Mpa in blasting

Fig.17

| | | Example 9 | Example 10 | Comparative Example 8 |
|---|---|---|---|---|
| Blasting step | Arithmetic mean inclination | ○ | ○ | — |
| Surface hydroxylation step | | A | A | — |
| | | ○ | ○ | — |
| | Heating temperature (°C) | 180 | 180 | — |
| | Treatment time (min) | 30 | 60 | — |
| Vickers hardness (HV 0.05) | | 165 | 178 | 80 |

METHOD OF MANUFACTURING COMPOSITE MEMBER AND THE COMPOSITE MEMBER

CROSS-REFERENCE TO RELATED APPLICATIONS

This application is based on and claims the benefit of priority from Japanese Patent Application No. 2020-053199 filed on Mar. 24, 2020, and the entire contents of which are incorporated herein by reference.

TECHNICAL FIELD

The present disclosure relates to a method of manufacturing a composite member and the composite member.

BACKGROUND

WO 2017/141381 discloses a method of manufacturing a composite member. In this method, the composite member is manufactured using a base material and a resin member that are bonded to each other. On a surface of the base material, micro-order or nano-order asperities are formed. A resin member is applied into the micro-order or nano-order asperities and is cured therein, producing an enhanced anchor effect as compared with millimeter-order asperities. Thus, the composite member manufactured by this method has high bonding strength.

SUMMARY

Aluminum is lighter and stronger than iron. Thus, aluminum is used as various components and is important as a base material of a composite member. The manufacturing method described in WO 2017/141381 is susceptible to improvement in view of improvement in the bonding strength of the composite member including the base material of aluminum.

According to an aspect of the present disclosure, a method of manufacturing a composite member is provided, the composite member including an aluminum member and a resin member that are bonded to each other. The manufacturing method includes performing blasting, modifying, and bonding. In the performing blasting, blasting is performed on the surface of the aluminum member. In the modifying, the surface of the aluminum member is modified into aluminum hydroxide. In the modifying, the surface of the aluminum member having undergone blasting is caused to react with water vapor by applying a pressure exceeding an atmospheric pressure. In the bonding, the resin member is directly bonded to the surface of the aluminum member modified to aluminum hydroxide.

According to the manufacturing method, blasting is performed on the surface of the aluminum member. Asperities are formed on the surface of the aluminum member having undergone blasting. The asperities contribute to an anchor effect. However, the asperities are formed by a collision of a blasting media and thus have sharp projections. The sharp projections may break the resin member. According to the manufacturing method, the surface of the aluminum member having undergone blasting is modified into the aluminum hydroxide. Thus, the sharp projections are rounded. The resin member is directly bonded to the surface of the aluminum member modified to aluminum hydroxide. The resin member is applied into the rounded asperities and is cured therein. As described above, according to the manufacturing method, sharp projections that may break the resin member can be removed by modifying, thereby improving the bonding strength of the composite member. Moreover, on the surface of the aluminum member, each oxygen atom of hydroxyl groups in the aluminum hydroxide and each hydrogen atom contained in the resin form hydrogen bonds. Thus, a chemical bond is formed between the surface of the aluminum member and the resin member, thereby improving the bonding strength. Furthermore, the surface of the aluminum member composed of the aluminum hydroxide has pores of several tens to several hundreds nm. This can enhance the anchor effect. Furthermore, the aluminum member is caused to react with water vapor by a pressure exceeding an atmospheric pressure, so that the surface of the aluminum member is partially modified into an amorphous layer containing, for example, aluminum atoms and oxygen atoms. The formation of the amorphous layer suppresses a specific potential difference between the materials of the aluminum member and the resin member and reduces corrosion of the aluminum member that is corroded by an electrochemical action. Thus, this manufacturing method can stably keep the bonding strength of the composite member.

According to an embodiment, in the modifying, the surface of the aluminum member having undergone blasting may be caused to react with water vapor by applying heat at a temperature of at least 140° C. In this case, the manufacturing method can easily modify the surface of the aluminum member into the aluminum hydroxide. Moreover, the surface of the aluminum member is heat-treated and thus causes precipitation hardening. Hence, this manufacturing method can increase the hardness of the composite member.

According to the embodiment, in the modifying, the surface of the aluminum member having undergone blasting may be caused to react with water vapor in a processing time of two to 24 hours. In this case, the manufacturing method can form an aluminum hydroxide layer with a proper concentration on the surface of the aluminum member.

According to the embodiment, the aluminum hydroxide may contain at least one selected from the group consisting of diaspore, boehmite, pseudo-boehmite, bayerite, norstrandite, gibbsite, and doyleite.

According to the embodiment, abrasive grains used in the performing blasting may have a particle size of 30 μm to 710 μm. In this case, according to this manufacturing method, an oxide film formed on the surface of the aluminum member can be properly removed. This can form a uniform aluminum hydroxide layer on the surface of the aluminum member.

According to the embodiment, the resin member may contain a conductive filler and have conductivity. With this configuration, the composite member in which the conductive resin member and the aluminum member are bonded to each other can be obtained. On a bonded portion between the aluminum member and the resin member, the amorphous layer containing aluminum atoms and oxygen atoms is formed. This suppresses a specific potential difference between the materials of the aluminum member and the resin member and reduces corrosion of the aluminum member that is corroded by an electrochemical action. Thus, this manufacturing method can stably keep the bonding strength of the composite member even if the resin member is a conductive member. Hence, this manufacturing method can provide greater flexibility in selecting the materials of the resin member.

According to another embodiment of the present disclosure, a composite member is provided. The composite member includes an aluminum member having asperities on the surface and a resin member in direct contact with the surface of the aluminum member. The surface of the aluminum member includes a deposit layer that is disposed on an aluminum base material and contains alloying elements deposited from the base material, an amorphous layer that is disposed on the deposit layer and contains aluminum atoms and oxygen atoms, and a contact layer that is disposed on the amorphous layer, contains aluminum hydroxide, and is in direct contact with the resin member. The aluminum base material may include a deposit layer containing alloying elements contained in the base material.

The composite member has the asperities on the surface of the aluminum member that is in direct contact with the resin member, thereby producing the anchor effect. Furthermore, the contact layer containing the aluminum hydroxide is formed on the surface of the aluminum member. Each oxygen atom of the hydroxyl groups in the aluminum hydroxide in the contact layer and each hydrogen atom contained in resin form hydrogen bonds. Thus, each chemical bond is formed between the surface of the aluminum member and the resin member, thereby improving the bonding strength. Furthermore, the contact layer on the surface of the aluminum member has pores of several tens to several hundreds nm. Hence, the composite member can enhance the anchor effect. Moreover, the amorphous layer containing aluminum atoms and oxygen atoms is formed on the surface of the aluminum member. This suppresses a specific potential difference between the materials of the aluminum member and the resin member and reduces corrosion of the aluminum member that is corroded by an electrochemical action. Thus, the composite member can stably keep the bonding strength. Furthermore, the deposit layer is formed on the surface of the aluminum member. In the deposit layer, the deposition of alloying elements from the aluminum base material causes precipitation hardening, so that the composite member can improve hardness.

According to an embodiment, the aluminum hydroxide may contain at least one selected from the group consisting of diaspore, boehmite, pseudo-boehmite, bayerite, norstrandite, gibbsite, and doyleite.

According to an embodiment, the resin member may contain a conductive filler and have conductivity. With this configuration, the composite member in which the conductive resin member and the aluminum member are bonded to each other can be obtained. On a bonded portion between the aluminum member and the resin member, the amorphous layer containing aluminum atoms and oxygen atoms is formed. This suppresses a specific potential difference between the materials of the aluminum member and the resin member and reduces corrosion of the aluminum member that is corroded by an electrochemical action. Thus, the composite member can stably keep the bonding strength even if the resin member is a conductive member. Hence, this manufacturing method can provide greater flexibility in selecting the materials of the resin member.

According to an aspect and an embodiment of the present disclosure, a method of manufacturing a composite member having high bonding strength and a composite member having high bonding strength are provided.

BRIEF DESCRIPTION OF THE DRAWINGS

FIG. 16 indicates the results of processing conditions and shearing strengths according to an example; and FIG. 17 indicates the measurement results of Vickers hardness of the aluminum members.

DETAILED DESCRIPTION

Figure 1:
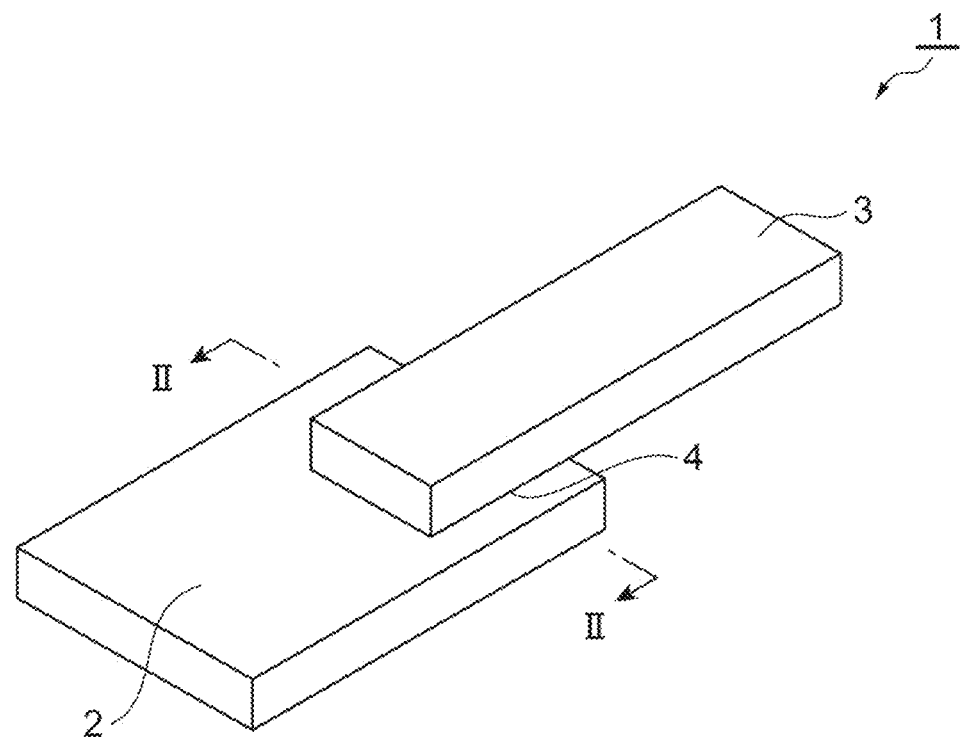
FIG. 1 is a perspective view illustrating a composite member according to an embodiment.

An embodiment will be described below with reference to the accompanying drawings. In the following explanation, the same or equivalent elements are indicated by the same reference numerals and a duplicate explanation thereof is omitted. Moreover, "bonding strength" in the present embodiment will be described as "shearing strength".

[Composite Member]

FIG. 1 is a perspective view illustrating a composite member 1 according to the embodiment. As illustrated in FIG. 1, the composite member 1 is a member including a plurality of members integrated by bonding. For example, the composite member 1 is a member including a resin member and a foreign member of the resin member, the resin and foreign members being bonded to each other. The foreign member of the resin member is a member made of materials having different characteristics from the materials of the resin member, such as a coefficient of thermal expansion, a coefficient of heat transfer, and strength.

The composite member 1 includes an aluminum member 2 and a resin member 3. The aluminum member 2 is, for example, a plate member. The resin member 3 is in direct contact with a surface of the aluminum member 2. In FIG. 1, the resin member 3 is in direct contact with a part of the surface of the aluminum member 2 (a contact surface 4 of the aluminum member 2) and has a lap joint structure. The material of the aluminum member 2 is an aluminum alloy.

The resin member 3 may be conductive resin containing a conductive filler. The resin member 3 contains a carbon material as the conductive filler, the carbon material containing, for example, at least one of powder of conductive carbon black such as Ketjen black, a plate containing at least one of graphite and graphene platelets, ultrashort fibers of carbon nanotubes, and fibers of carbon fiber reinforced thermo plastics (CFRTP). The resin member 3 may contain a metallic material as the conductive filler, the metallic material containing, for example, at least one of powder containing at least one of gold (Au), silver (Ag), nickel (Ni), copper (Cu), zinc (Zn), aluminum (Al), and stainless steel, flakes containing at least one of silver (Ag), nickel (Ni), copper (Cu), zinc (Zn), aluminum (Al), and stainless steel, and fibers containing at least one of copper (Cu), stainless steel, and brass.

The resin member 3 may contain a metal oxide material as the conductive filler, the metal oxide material containing, for example, at least one of tin oxide ($SnO_2$) doped with antimony (Sb), indium oxide ($In_2O_3$) doped with tin, and zinc oxide (ZnO) doped with aluminum. The resin member 3 may contain a metal coating material as the conductive filler, the metal coating material containing at least one of powder and fibers. The conductive filler contains, for example, at least one of nickel (Ni) and aluminum (Al) as a covering material and mica, glass beads, glass fibers, carbon fibers, calcium carbonate, zinc oxide, and titanium oxide as a base filler. The resin member 3 may contain at least one of the carbon material, the metallic material, the metal oxide material, and the metallic coating material.

The resin member 3 may not be conductive resin containing a conductive filler. In this case, for example, the materials of the resin member 3 may include resins such as polybutylene terephthalate, polyphenylene sulfide, polyamide, a liquid crystal polymer, polypropylene, and acrylonitrile-butadiene-styrene.

Figure 2:
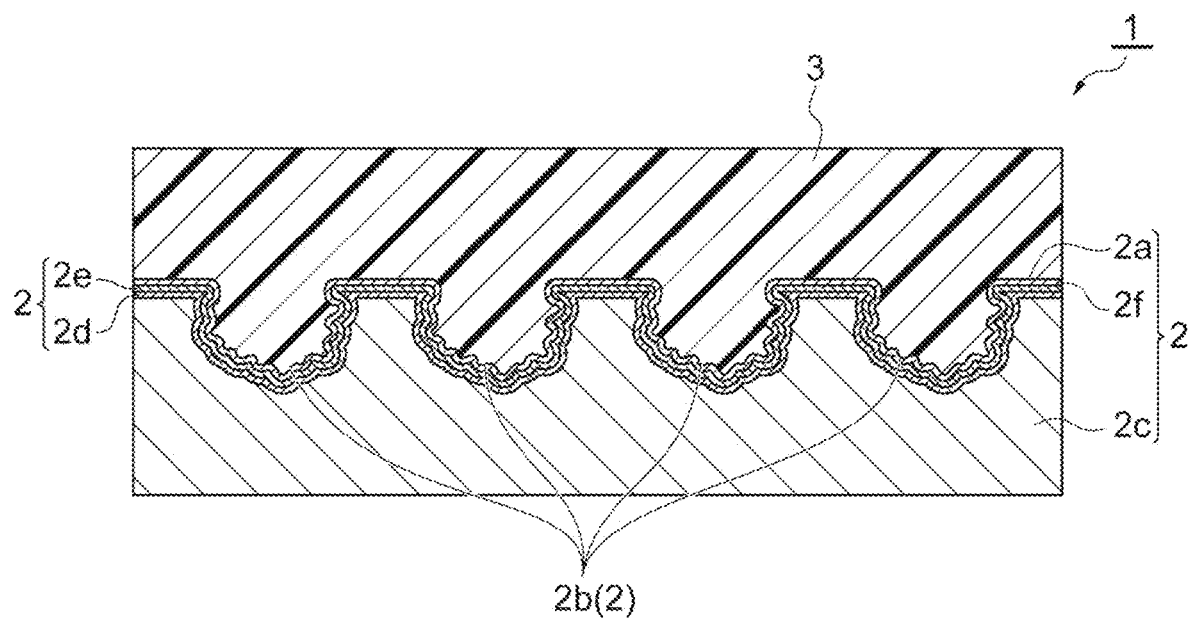
FIG. 2 is a cross-sectional view of the composite member taken along line II-II of FIG. 1.

FIG. 2 is a cross-sectional view of the composite member 1 taken along line II-II of FIG. 1. As illustrated in FIG. 2, the aluminum member 2 has asperities 2b on a part (contact surface 4) of a surface 2a. The asperities 2b are micro-order or nano-order asperities. The micro-order asperities are asperities having a height difference of 1 μm to less than 1000 μm. The nano-order asperities are asperities having a height difference of 1 nm to less than 1000 nm. The ends of the asperities 2b are chamfered. Thus, the asperities 2b are rounded and have no acute-angled points. The resin member 3 is fixed into the asperities 2b and thus produces an anchor effect.

Furthermore, the surface 2a of the aluminum member 2 has a deposit layer 2d disposed on an aluminum base material 2c, an amorphous layer 2e disposed on the deposit layer 2d, and a contact layer 2f disposed on the amorphous layer 2e. The base material 2c is mainly composed of aluminum atoms and the deposit layer 2d is formed on a part of the base material 2c.

The deposit layer 2d is a layer formed by the deposition of aluminum alloying elements such as silicon (Si) or magnesium (Mg) from the base material 2c of the aluminum member 2 by heat treatment. The deposit layer 2d is disposed on the base material 2c. The deposit layer 2d is closest to the base material 2c in a three-layer structure including the deposit layer 2d, the amorphous layer 2e, and the contact layer 2f. The aluminum base material 2c may include a deposit layer containing aluminum alloying elements contained in the base material 2c. For example, by heat treatment, the base material 2c adjacent to the deposit layer 2d may contain aluminum alloying elements like the deposit layer 2d.

The amorphous layer 2e is a layer containing aluminum atoms and oxygen atoms in an amorphous state. For example, the amorphous layer 2e is made of dense alumina ($Al_2O_3$). The amorphous layer 2e is disposed on the deposit layer 2d (closer to the resin member 3 than the deposit layer 2d) and has a thickness of, for example, several tens nm to several μm.

The contact layer 2f contains aluminum hydroxide and is in direct contact with the resin member 3. The contact layer 2f is disposed on the amorphous layer 2e (closer to the resin member 3 than the amorphous layer 2e). The surface of the contact layer 2f is exposed and has pores of several tens to several hundreds nm. The aluminum hydroxide is an aluminum compound having a hydroxyl group. The aluminum hydroxide contains at least one of diaspore, boehmite, pseudo-boehmite, bayerite, norstrandite, gibbsite, and doyleite. The aluminum hydroxide may contain any one of diaspore, boehmite, pseudo-boehmite, bayerite, norstrandite, gibbsite, and doyleite. The aluminum hydroxide may contain multiple kinds of aluminum hydroxide selected from diaspore, boehmite, pseudo-boehmite, bayerite, norstrandite, gibbsite, and doyleite.

The resin member 3 partially applied into the asperities 2b is bonded to the aluminum member 2. Such a structure is formed by injection molding using a mold 20, which will be described later. The composite member 1 may be bonded using techniques other than injection forming, for example, ultrasonic bonding, press forming, or vibration bonding.

As described above, the composite member 1 according to the present embodiment has the asperities 2b on the surface 2a of the aluminum member 2 that is in direct contact with the resin member 3, thereby producing the anchor effect. Furthermore, the surface 2a of the aluminum member 2 has the deposit layer 2d, the amorphous layer 2e, and the contact layer 2f. Each oxygen atom of the hydroxyl groups in the aluminum hydroxide in the contact layer 2f and each hydrogen atom contained in resin form hydrogen bonds. Thus, each chemical bond is formed between the surface 2a of the aluminum member 2 and the resin member 3, thereby improving the bonding strength. Furthermore, the contact layer 2f on the surface 2a the aluminum member 2 has pores of several tens to several hundreds nm, thereby enhancing the anchor effect. Hence, the composite member 1 has high bonding strength. Moreover, the amorphous layer 2e containing aluminum atoms and oxygen atoms is formed on the surface 2a of the aluminum member 2. This suppresses a specific potential difference between the materials of the aluminum member 2 and the resin member 3 and reduces corrosion of the aluminum member 2 that is corroded by an electrochemical action. Thus, the composite member 1 can stably keep the bonding strength. Furthermore, the deposit layer 2d is formed on the surface 2a of the aluminum member 2. In the deposit layer 2d, the deposition of alloying elements from the aluminum base material 2c causes precipitation hardening, so that the composite member 1 can improve hardness.

Method of Manufacturing the Composite Member

Figure 3:
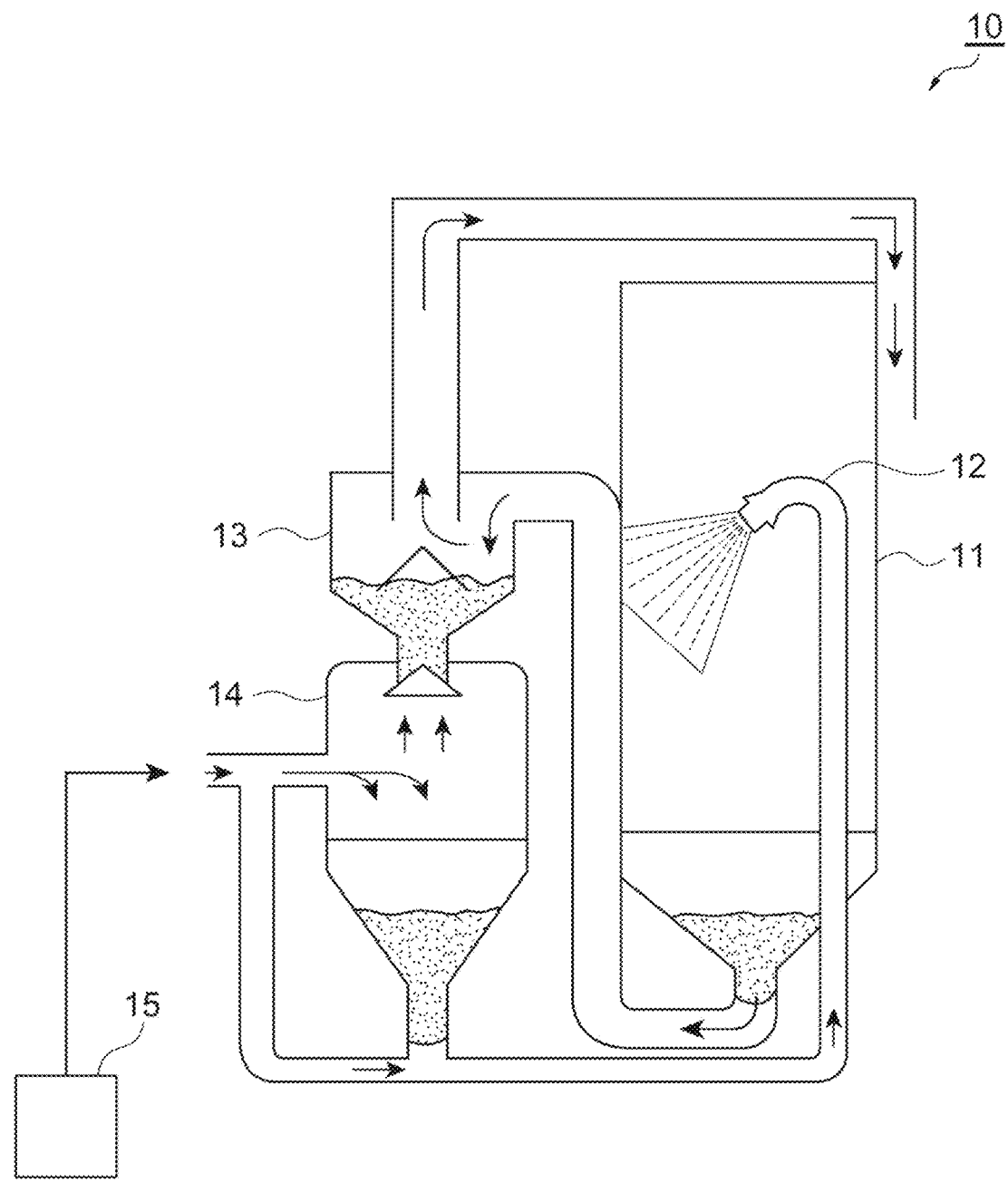
FIG. 3 is a conceptual diagram illustrating a blasting machine used for a method of manufacturing the composite member according to the embodiment.

The outline of a machine used for the method of manufacturing the composite member 1 will be described below. The machine for blasting the surface of the aluminum member 2 will be first discussed below. The blasting machine may be any type of a gravity (suction) air-blast machine, a straight-hydraulic (pressure) air-blast machine, and a centrifugal blasting machine. In the manufacturing method according to the present embodiment, a so-called straight-hydraulic (pressure) air-blast machine is used as an example. FIG. 3 is a conceptual diagram illustrating a blasting machine 10 used for the method of manufacturing the composite member 1. The blasting machine 10 includes a blast chamber 11, a blast nozzle 12, a storage tank 13, a pressure chamber 14, a compressed-air feeder 15, and a dust collector (not illustrated).

The blast nozzle 12 is stored in the blast chamber 11 and blasting is performed on a workpiece (aluminum member 2) in the blast chamber 11. A blasting media from the blast nozzle 12 falls with dust to the bottom of the blast chamber 11. The fallen blasting media is fed into the storage tank 13 and the dust is fed into the dust collector. The blasting media stored in the storage tank 13 is fed into the pressure chamber 14 and then the pressure chamber 14 is pressurized by the compressed-air feeder 15. The blasting media stored in the pressure chamber 14 is fed with compressed air into the blast nozzle 12. In this way, the workpiece undergoes blasting while the blasting media is circulated.

Figure 4:
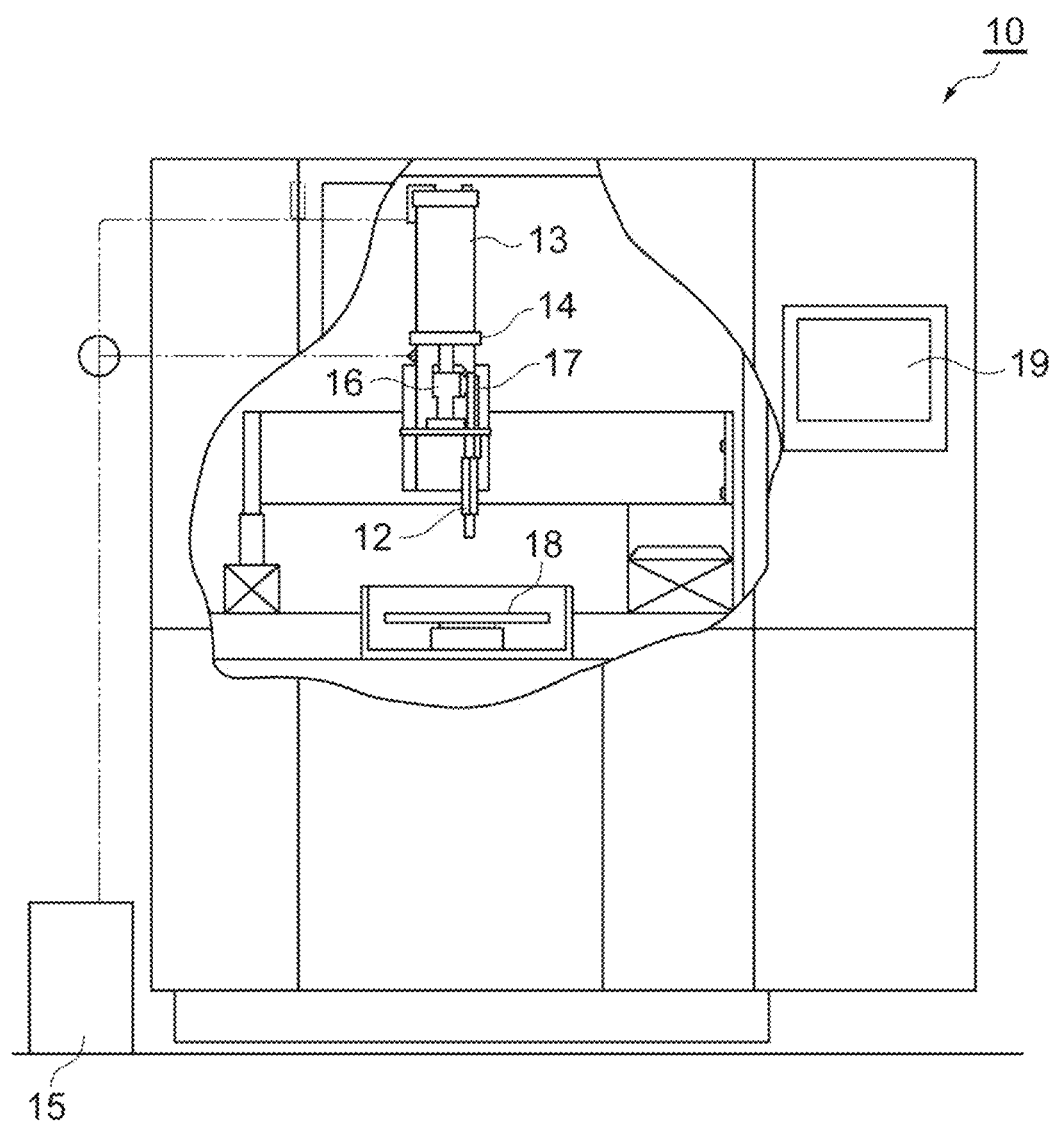
FIG. 4 is an explanatory drawing illustrating the configuration of the blasting machine used for the method of manufacturing the composite member according to the embodiment.

FIG. 4 is an explanatory drawing illustrating the configuration of the blasting machine 10 used for the method of manufacturing the composite member 1 according to the embodiment. The blasting machine 10 in FIG. 4 is the straight-hydraulic blasting machine illustrated in FIG. 3. In FIG. 4, the wall surface of the blast chamber 11 is partially omitted.

As illustrated in FIG. 4, the blasting machine 10 includes the blasting-media storage tank 13 and the pressure chamber 14 that are connected to the compressed-air feeder 15 and have sealed structures, a fixed-quantity feeding part 16 communicating with the storage tank 13 in the pressure chamber 14, the blast nozzle 12 communicating with the fixed-quantity feeding part 16 via a connecting pipe 17, a work table 18 that can move while holding a workpiece below the blast nozzle 12, and a control unit 19.

The control unit 19 controls the constituent elements of the blasting machine 10. The control unit 19 includes, for example, a display unit and a processing unit. The processing unit is a typical computer including a CPU and a storage unit. The control unit 19 controls a feed rate from the compressed-air feeder 15 that feeds compressed air to the storage tank 13 and the pressure chamber 14 based on a set blast pressure and a set blast velocity. Moreover, the control unit 19 controls the position of a blast from the blast nozzle 12 based on a distance between the set workpiece and the nozzle and the scanning conditions (including a speed, a feed pitch, and the number of scans) of the workpiece. As a specific example, the control unit 19 controls the position of the blast nozzle 12 by using a scanning speed (X direction) and a feed pitch (Y direction) that are set before blasting. The control unit 19 controls the position of the blast nozzle 12 by moving the work table 18 holding the workpiece.

Figure 5:
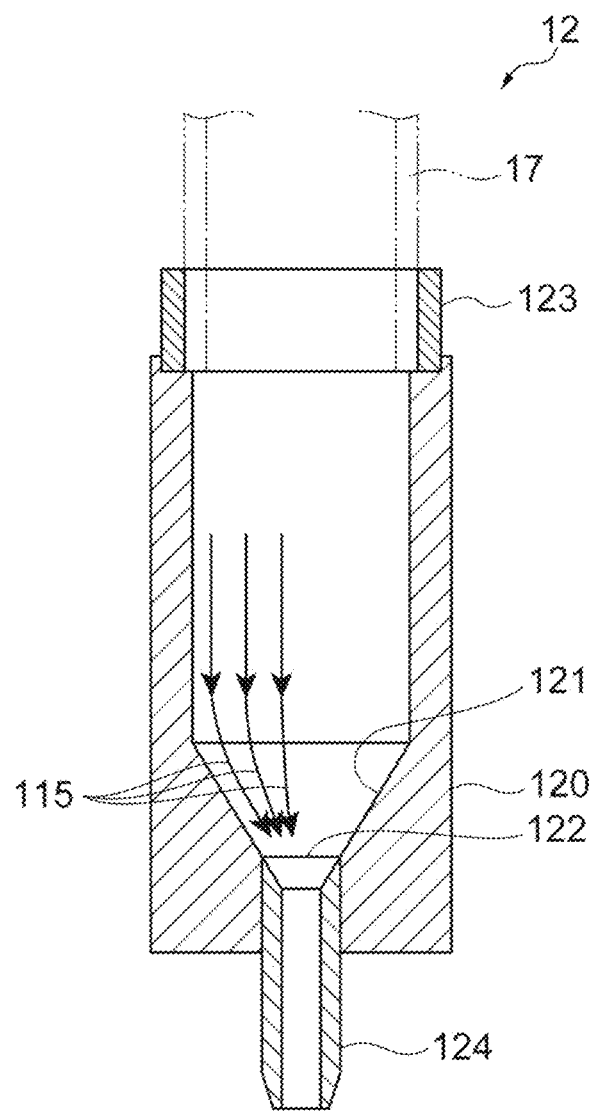
FIG. 5 is a cross-sectional view of a blast nozzle illustrated in FIG. 4.

FIG. 5 is a cross-sectional view of the blast nozzle 12 illustrated in FIG. 4. The blast nozzle 12 has a blast-tube holder 120 serving as a body part. The blast-tube holder 120 is a cylindrical member having a space for passing the blasting media and compressed air therein. One end of the blast-tube holder 120 is a blasting-media inlet port 123 and the other end of the blast-tube holder 120 is a blasting-media outlet port 122. The blast-tube holder 120 includes a convergence acceleration part 121 that is conical with an angle of tilt, the convergence acceleration part 121 having an inner wall surface tapering from the blasting-media inlet port 123 toward the blasting-media outlet port 122. A cylindrical blast tube 124 communicates with the blasting-media outlet port 122 of the blast-tube holder 120. The convergence acceleration part 121 tapers from the midpoint of the cylindrical shape of the blast-tube holder 120 toward the blast tube 124. This forms a compressed airflow 115.

The connecting pipe 17 of the blasting machine 10 is connected to the blasting-media inlet port 123 of the blast nozzle 12. This forms a blasting media passage that sequentially connects the storage tank 13, the fixed-quantity feeding part 16 in the pressure chamber 14, the connecting pipe 17, and the blast nozzle 12.

In the blasting machine 10 configured thus, compressed air is fed from the compressed-air feeder 15 to the storage tank 13 and the pressure chamber 14 after the quantity of compressed air is controlled by the control unit 19. Subsequently, the blasting media in the storage tank 13 is quantitatively determined by the fixed-quantity feeding part 16 in the pressure chamber 14 with a constant pressure flow force, the blasting media is fed into the blast nozzle 12 through the connecting pipe 17, and then the blasting media is directed from the blast tube of the blast nozzle 12 onto the work surface of the workpiece. Thus, a fixed quantity of the blasting media is always directed onto the work surface of the workpiece. Subsequently, the position of a blast directed from the blast nozzle 12 onto the work surface of the workpiece is controlled by the control unit 19 and then the workpiece undergoes blasting.

The directed blasting media and cut powder generated by blasting are sucked by the dust collector, which is not illustrated. On a passage from the blast chamber 11 to the dust collector, a classifier, which is not illustrated, is disposed to separate a reusable blasting media and other fine powder (blasting media not in a reusable size or cut powder generated by blasting). The reusable blasting media is stored in the storage tank 13 and then is fed into the blast nozzle 12 again. The fine powder is collected by the dust collector.

Figure 6:
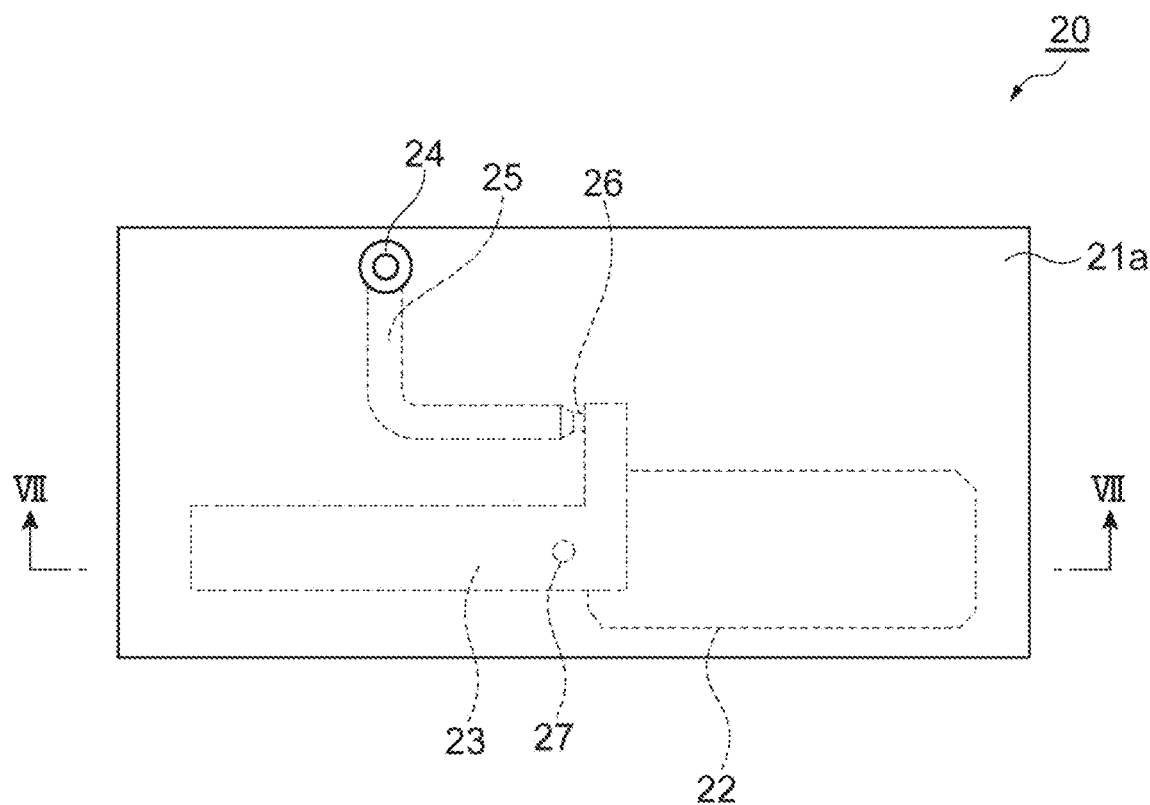
FIG. 6 is a top view of a mold used for press forming.
Figure 7:
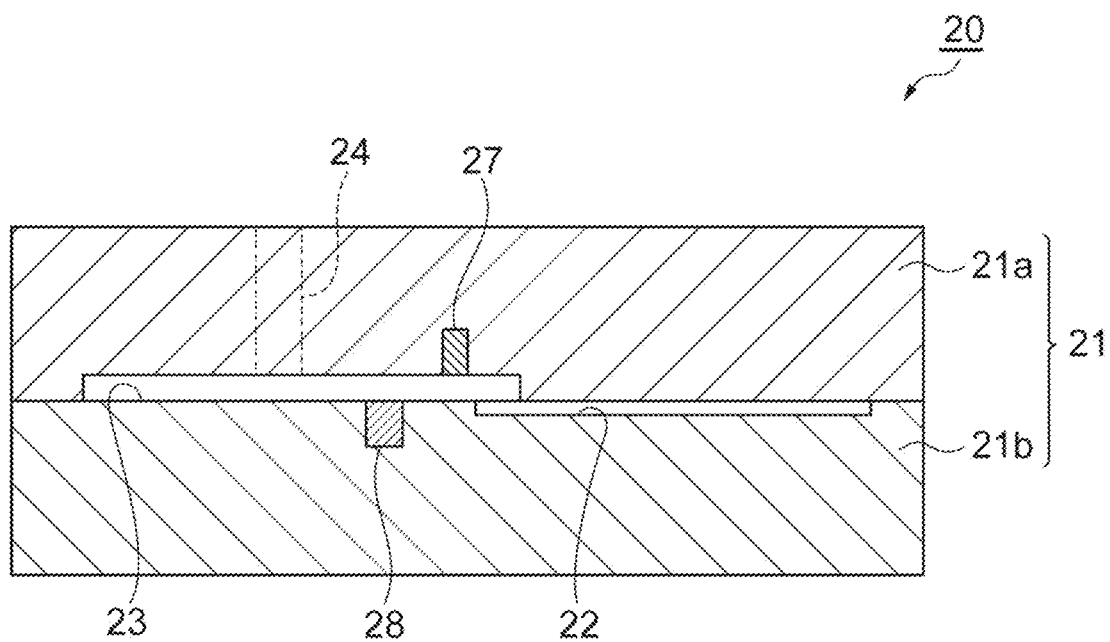
FIG. 7 is a cross-sectional view of the mold taken along line VII-VII of FIG. 6.

Injection molding will be described below. In this case, insert molding is used as injection molding. In insert molding, an insert is placed into a predetermined mold and then resin is injected and is cured after being retained for a predetermined period of time. Thereafter, the residual stress of the resin is removed by heat treatment. FIG. 6 is a top view of the mold used for injection molding. FIG. 7 is a cross-sectional view of the mold taken along line VII-VII of FIG. 6. As illustrated in FIGS. 6 and 7, a mold 20 includes a mold body 21 (a cope 21*a* and a drag 21*b*). Between the cope 21*a* and the drag 21*b*, a space 22 for placing the insert (in this configuration, the aluminum member 2) and a space 23 for injecting resin are provided. On the top surface of the cope 21*a*, a resin inlet is provided. The resin inlet communicates with the space 23 through a sprue 24, a runner 25, and a gate 26. A pressure sensor 27 and a temperature sensor 28 are provided in the space 23 and detect a pressure and a temperature in the space 23. Based on the detection results of the pressure sensor 27 and the temperature sensor 28, the parameters of a molding machine, which is not illustrated, are adjusted and then a molded article is manufactured. The parameters include a mold temperature, a temperature of resin being charged, a charging pressure, an injection rate, a retention time, a pressure during retention, a heat treatment temperature, and a heat treatment time. The article molded by the mold 20 has a lap joint structure that is joined with a predetermined structure.

Figure 8:
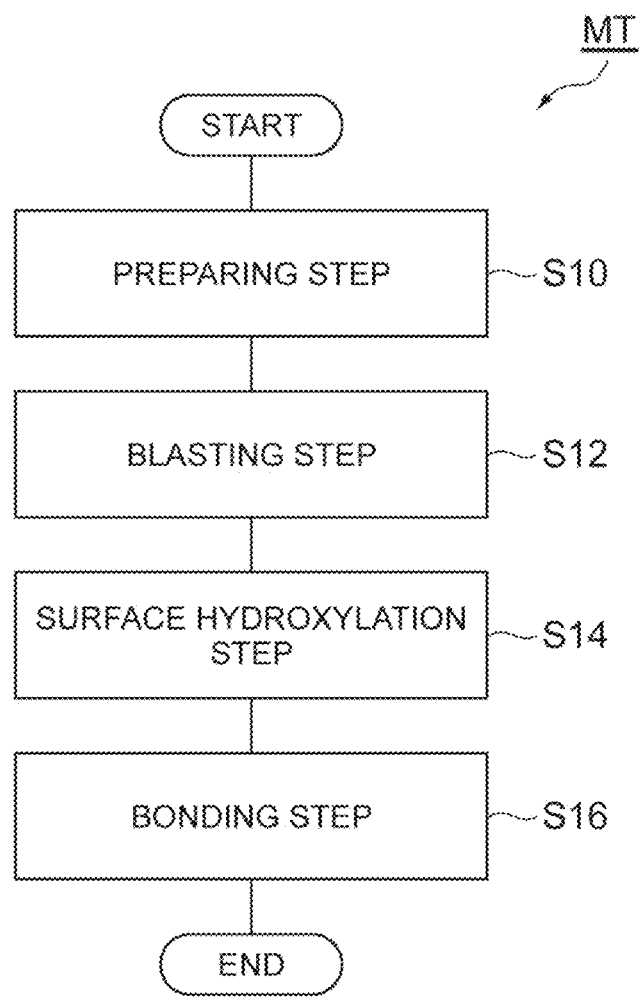
FIG. 8 is a flowchart of the method of manufacturing the composite member according to the embodiment.

The flow of the method of manufacturing the composite member 1 will be described below. FIG. 8 is a flowchart of a method MT of manufacturing the composite member 1 according to the embodiment. As depicted in FIG. 8, first, a predetermined blasting media is charged into the blasting machine 10 as a preparing step (S10). The particle size of the blasting media (abrasive grain) is, for example, 30 μm to 710 μm. The smaller the particle size of the blasting media is, the smaller mass of the blasting media is. This leads to a small inertial force. Thus, if the particle size of the blasting media is smaller than 30 μm, it is difficult to form the asperities 2*b* in desired shapes. Moreover, the aluminum member 2 to be industrially used is typically stored in the atmosphere and the surface of the aluminum member 2 is covered with an uneven aluminum amorphous oxide film having a thickness of 60 nm to 300 nm. Hence, surface etching using a chemical agent and surface laser beam machining may cause uneven surface treatment because of the aluminum amorphous oxide film. In order to uniformly modify the surface 2a of the aluminum member 2 in a surface hydroxylation step (S14), which will be discussed later, the aluminum amorphous oxide film needs a thickness of about 30 nm or less. However, if the particle diameter of the blasting media exceeds 710 μm, it is difficult to grind the aluminum amorphous oxide film to a thickness of about 30 nm or less. Hence, an aluminum oxide formed on the surface of the aluminum member 2 cannot be sufficiently removed. The asperities can be formed and the aluminum amorphous oxide film can be removed if abrasive grains have a particle size of 30 μm to 710 μm.

The control unit 19 of the blasting machine 10 acquires blasting conditions as the preparing step (S10). The control unit 19 acquires the blasting conditions based on an operation by an operator or information stored in the storage unit. The blasting conditions include a blast pressure, a blast velocity, a distance between nozzles, and workpiece scanning conditions (a speed, a feed pitch, and the number of scans). The blast pressure is, for example, 0.5 to 2.0 MPa. The lower the blast pressure, the smaller the inertial force. Thus, if the blast pressure is smaller than 0.5 MPa, it is difficult to form the asperities 2b in desired shapes. The higher the blast pressure, the larger the inertial force. Hence, the blasting media is likely to be crushed by a collision with the aluminum member 2. This leads to the following problems: (1) poor working efficiency caused by the dispersion of collision energy in a process other than the formation of the asperities 2b and (2) high cost because the blasting media considerably wears. Such problems become apparent when the blast pressure exceeds 2.0 MPa. The control unit 19 precisely performs micro-order or nano-order control on the size, depth, and density of the asperities 2b on the surface 2a of the aluminum member 2 by managing the blasting conditions. The blasting conditions may include a condition for specifying a blasting region. In this case, selective surface treatment is achieved. Moreover, in the preparing step (S10), ultrasonic cleaning may be performed on the aluminum member 2 with ethanol or the like for a predetermined time.

Figure 9:
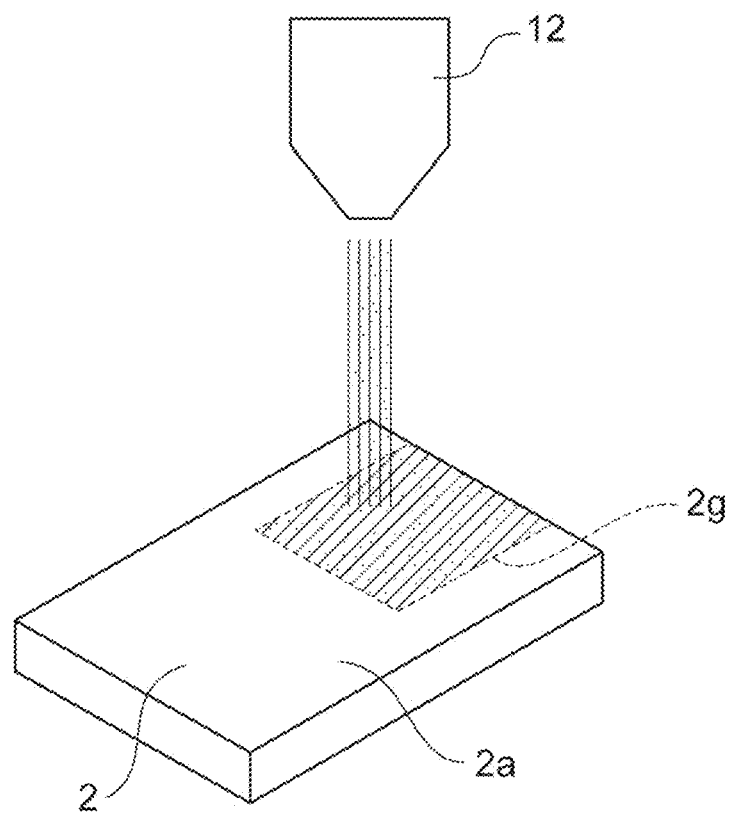
FIG. 9 is a conceptual diagram of blasting.
Figure 10:
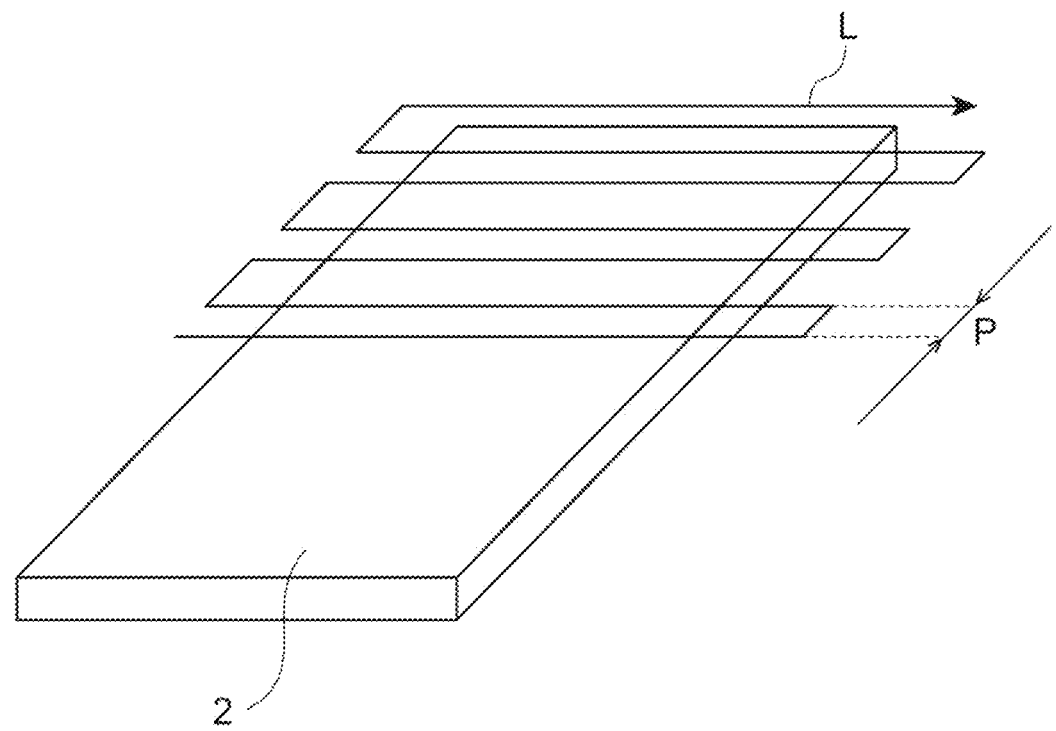
FIG. 10 is an explanatory drawing of a scan of blasting.

Subsequently, the blasting machine 10 performs a series of processing as a blasting step (S12) as follows: First, the aluminum member 2 that is a target of blasting is set on the work table 18 in the blast chamber 11. The control unit 19 then activates the dust collector, which is not illustrated. The dust collector reduces a pressure in the blast chamber 11 to a negative pressure based on the control signal of the control unit 19. Thereafter, based on the control signal of the control unit 19, the blast nozzle 12 sends a blast of the blasting media as a solid/gas two-phase flow of compressed air at a blast pressure of 0.5 to 2.0 MPa. The control unit 19 then activates the work table 18 and moves the aluminum member 2 into a blast flow of the solid/gas two-phase flow (below the blast nozzle in FIG. 4). FIG. 9 is a conceptual diagram of blasting. As illustrated in FIG. 9, the blasting media is jetted from the blast nozzle 12 to a partial region 2g of the surface 2a of the aluminum member 2. At this point, the control unit 19 continuously activates the work table 18 such that a blast flow draws a predetermined path on the aluminum member 2. FIG. 10 is an explanatory drawing of a scan of blasting. As illustrated in FIG. 10, the control unit 19 operates the work table 18 according to a path L for scanning with the feed pitch P. This forms the micro-order or nano-order asperities 2b on the surface of the aluminum member 2 as desired.

By blasting using the blasting media having a particle size of 30 to 710 lam at a blast pressure of 0.5 to 2.0 MPa, the micro-order or nano-order asperities 2b are formed on the surface 2a of the aluminum member 2 as desired (for example, the asperities 2b having an arithmetic mean inclination RΔa and a root-mean-square inclination RΔq that are controlled to 0.17 to 0.50 and 0.27 to 0.60, respectively, in compliance with JIS (Japanese Industrial Standards) B 0601 (1994)). Furthermore, the amorphous oxide film on the surface of the aluminum member 2 has a thickness of about 9 nm or less. After the operation of the blasting machine 10 is stopped, the aluminum member 2 is removed and blasting is completed.

Figure 11A:
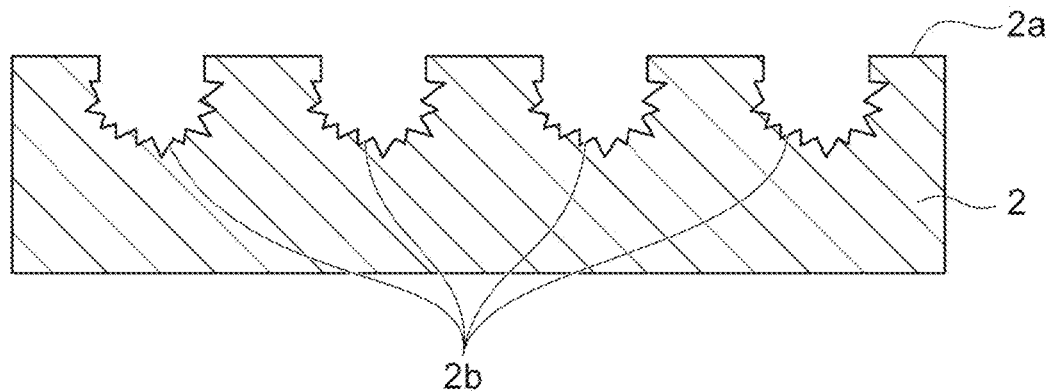
FIGS. 11A-11C illustrate explanatory drawings of the manufacturing process of the composite member.
Figure 11B:
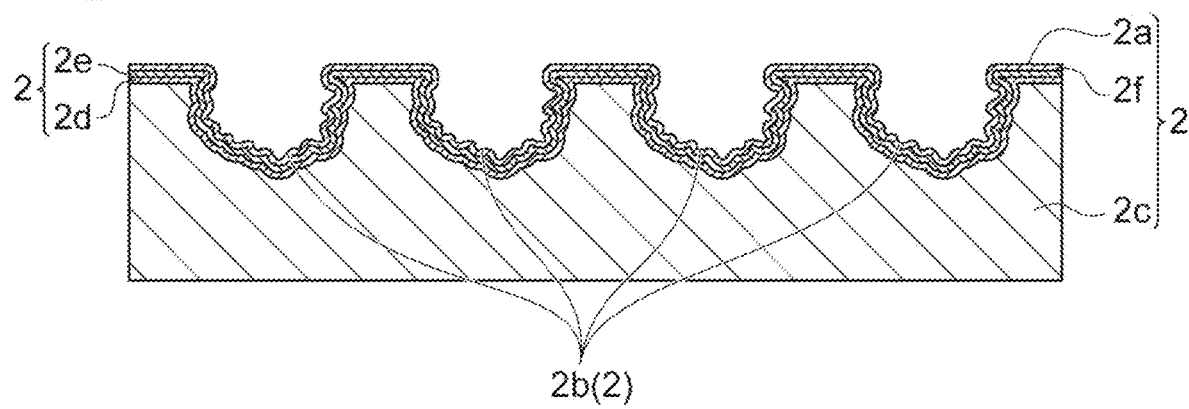
Figure 11C:
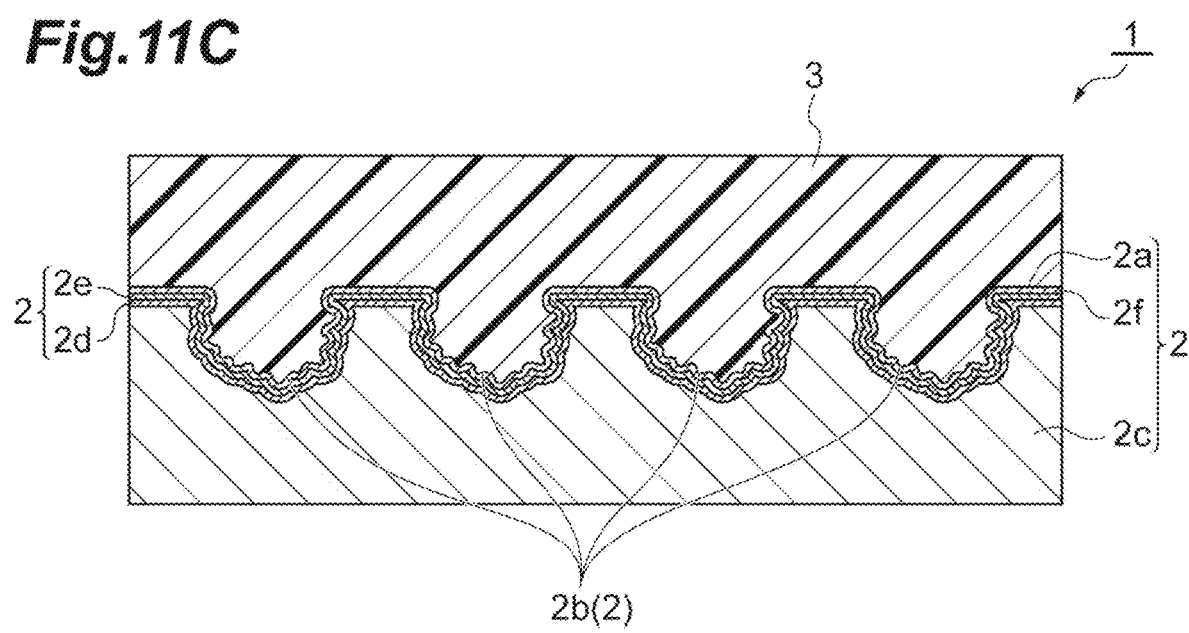

FIGS. 11A-11C are explanatory drawings of the manufacturing process of the composite member. As illustrated in FIG. 11A, the asperities 2b of the surface 2a of the aluminum member 2 have sharp projections after blasting.

Subsequently, as the surface hydroxylation step (S14), the surface 2a of the aluminum member 2 having undergone blasting is caused to react with water vapor by applying a pressure exceeding an atmospheric pressure and the surface 2a of the aluminum member 2 is modified into aluminum hydroxide. In the surface hydroxylation step (S14), the surface 2a of the aluminum member 2 is caused to react with water vapor by using steam treatment. In the steam treatment, the aluminum member 2 having undergone blasting and water are placed into a pressure container, are heated to 140° C. or higher, and are subjected to a pressure exceeding the atmospheric pressure, so that the pressure container is filled with water vapor. The pressure container is, for example, an autoclave.

Thus, as illustrated in FIG. 11B, the asperities 2b are rounded. Furthermore, on the surface 2a of the aluminum member 2, the three-layer structure including the deposit layer 2d, the amorphous layer 2e, and the contact layer 2f is formed.

In the steam treatment, the aluminum member 2 having undergone blasting is exposed to water vapor, which is heated to at least 140° C., for a predetermined period, so that the surface 2a of the aluminum member 2 is heated and thus forms the deposit layer 2d on the base material 2c of the aluminum member 2. In the deposit layer 2d, aluminum alloying elements such as silicon (Si) or magnesium (Mg) from the base material 2c are deposited and hardened.

The surface of the surface 2a of the aluminum member 2 is oxidized by water vapor while being subjected to a pressure exceeding the atmospheric pressure, so that the amorphous layer 2e is formed on the deposit layer 2d (closer to the resin member 3 than the deposit layer 2d). The amorphous layer 2e is a layer containing aluminum atoms and oxygen atoms in an amorphous state. For example, the amorphous layer 2e is made of dense alumina ($Al_2O_3$).

The surface of the surface 2a of the aluminum member 2 is modified into aluminum hydroxide by water vapor while being subjected to a pressure exceeding the atmospheric pressure, so that the contact layer 2f is formed on the amorphous layer 2e (closer to the resin member 3 than the amorphous layer 2e). The contact layer 2f contains aluminum hydroxide. The aluminum hydroxide of the contact layer 2f mainly contains boehmite. The aluminum hydroxide of the contact layer 2f is not limited to boehmite and contains any one of diaspore, boehmite, pseudo-boehmite, bayerite, norstrandite, gibbsite, and doyleite. The aluminum hydroxide of the contact layer 2f may contain multiple kinds of aluminum hydroxide selected from diaspore, boehmite, pseudo-boehmite, bayerite, norstrandite, gibbsite, and doyleite.

From the viewpoint of the resistance of the pressure container, a pressure applied to the aluminum member 2 and water is higher than the atmospheric pressure (0.1013 MPa) and is not higher than 3.0 MPa. The aluminum member 2 and water vapor are caused to react for, for example, two to 24 hours from the moment the aluminum member 2 and water vapor reach a heating temperature of 140° C. or higher. In the surface hydroxylation step (S14), the surface of the aluminum member may be cleaned with water. In this case, the surface of the aluminum member is cleaned with water, thereby reducing a surface carbon concentration.

Subsequently, the molding machine, which is not illustrated, performs injection molding with the mold 20 as a bonding step (S16). The mold 20 is first opened, the aluminum member 2 with the three-layer structure of the deposit layer 2d, the amorphous layer 2e, and the contact layer 2f is placed into the space 22, and then the mold is closed. The molding machine then injects dissolved resin, which has a set resin temperature, into the mold 20 from the resin inlet. The injected resin passes through the sprue 24, the runner 25, and the gate 26 and is charged into the space 23. The molding machine controls the charging pressure and the injection rate of resin based on the detection result of the pressure sensor 27. The molding machine controls a mold temperature to a set value based on the detection result of the temperature sensor 28. Moreover, the molding machine controls a pressure to the set value during a set retention time based on the detection result of the pressure sensor 27. Thereafter, the molding machine performs heat treatment based on a set heat-treatment temperature and a set heat-treatment time. The molding machine then opens the mold 20 and removes the composite member 1 in which the three-layer structure of the deposit layer 2d, the amorphous layer 2e, and the contact layer 2f, the aluminum member 2, and the resin member 3 have been integrated. At the end of the bonding step (S18), the flowchart in FIG. 8 is completed. The composite member 1 in FIG. 11C is manufactured thus.

As described above, according to the manufacturing method MT, blasting is performed on the surface 2a of the aluminum member 2. The asperities 2b having sharp projections are formed on the surface 2a of the aluminum member 2 having undergone blasting. Thereafter, the surface 2a of the aluminum member 2 is mainly modified into aluminum hydroxide that is boehmite. Thus, the sharp projections are rounded. The resin member 3 is then directly bonded to the surface 2a of the aluminum member 2 modified to aluminum hydroxide. The resin member 3 is applied into the rounded asperities 2b and is cured therein. As described above, according to the manufacturing method MT, sharp projections that may break the resin member 3 can be removed by the surface hydroxylation step (S14), thereby improving the bonding strength of the composite member 1.

Moreover, in the contact layer 2f formed on the surface 2a of the aluminum member 2, each oxygen atom of hydroxyl groups of boehmite and each hydrogen atom contained in the resin mainly form hydrogen bonds. Thus, each chemical bond is formed between the surface 2a of the aluminum member 2 and the resin member 3, thereby improving the bonding strength. Furthermore, the contact layer 2f on the surface 2a the aluminum member 2 mainly composed of boehmite has pores of several tens to several hundreds nm. This can enhance the anchor effect. Moreover, an aluminum oxide film formed on the surface 2a of the aluminum member 2 is removed by blasting. An aluminum oxide film may interfere with the formation of the contact layer 2f. According to the manufacturing method MT, an aluminum oxide film is removed before aluminum hydroxide is formed, thereby uniformly modifying the surface 2a of the aluminum member 2 into aluminum hydroxide.

Furthermore, in the surface hydroxylation step (S14), the aluminum member 2 reacts with water vapor by a pressure exceeding atmospheric pressure, so that the surface 2a of the aluminum member 2 is partially modified into the amorphous layer 2e containing aluminum atoms and oxygen atoms. This suppresses a specific potential difference between the materials of the aluminum member 2 and the resin member 3 and reduces corrosion of the aluminum member 2 that is corroded by an electrochemical action. Thus, the composite member 1 can stably keep the bonding strength.

According to the manufacturing method MT, in the surface hydroxylation step (S14), the surface 2a of the aluminum member 2 is caused to react with water vapor by applying heat at 140° C. or higher, so that the surface 2a of the aluminum member 2 can be easily modified into the contact layer 2f. Furthermore, the surface 2a of the aluminum member 2 is heat-treated, thereby forming the deposit layer 2d. In the deposit layer 2d, the deposition of alloying elements from the aluminum base material 2c causes precipitation hardening, so that the hardness of the composite member 1 can be improved in the manufacturing method.

According to the manufacturing method MT, in the surface hydroxylation step (S14), the surface 2a of the aluminum member 2 is caused to react with water vapor for two to 24 hours, thereby forming the contact layer 2f with a proper density on the surface 2a of the aluminum member 2.

The contact layer 2f contains at least one of diaspore, boehmite, pseudo-boehmite, bayerite, norstrandite, gibbsite, and doyleite. The contact layer 2f containing a combination of multiple hydroxides of aluminum from among the foregoing hydroxides of aluminum is formed such that the aluminum member 2 and water are heated at a lower temperature in the surface hydroxylation step (S14) than the contact layer 2f containing any one of the hydroxides of aluminum.

According to the manufacturing method MT, the surface 2a of the aluminum member 2 is cleaned with water, thereby suppressing a reduction in bonding strength when the bonding strength is reduced by contamination with carbon. According to the manufacturing method MT, the particle size of abrasive grains used for the blasting step is 30 μm to 710 μm, so that an oxide film formed on the surface 2a of the aluminum member 2 can be properly removed. This can uniformly form the contact layer 2f on the surface 2a of the aluminum member 2. Furthermore, the particle size of abrasive grains used for the blasting step is set in the above-mentioned range, thereby forming the asperities 2b with a proper arithmetic mean inclination on the surface 2a of the aluminum member 2.

According to the manufacturing method MT, in the surface hydroxylation step (S14), the amorphous layer 2e is formed on the surface 2a of the aluminum member 2. This suppresses a specific potential difference between the materials of the aluminum member 2 and the resin member 3 and reduces corrosion of the aluminum member that is corroded by an electrochemical action. Thus, this manufacturing method MT can stably keep the bonding strength of the composite member 1 even if the resin member 3 is a conductive member. Hence, this manufacturing method MT can provide greater flexibility in selecting the materials of the resin member 3.

The foregoing embodiment does not limit the present disclosure. As a matter of course, the present disclosure can be modified in various ways without departing from the scope of the disclosure.

Modification of the Base Material and the Resin Member

The aluminum member 2 and the resin member 3 were described as plate members in the embodiment. The shapes are not limited and any shapes can be used as long as the members can be brought into contact with each other. The resin member 3 according to the embodiment is in contact with a part of the surface of the aluminum member 2. The resin member 3 may be brought into contact with the overall surface of the aluminum member 2.

Modification of Bonding

The aluminum member 2 and the resin member 3 may be bonded by press forming. In the press forming, the aluminum member 2 and the resin member 3 are fixed by the mold, so that the accuracy of dimension of the bonded composite member 1 can be higher than in other bonding methods. The aluminum member 2 and the resin member 3 may be bonded by ultrasonic bonding. In the ultrasonic bonding, the molding machine may bond the aluminum member 2 and the resin member 3 by ultrasonically vibrating at least one of the aluminum member 2 and the resin member 3. In the ultrasonic bonding, only the bonded part between the aluminum member 2 and the resin member 3 is heated, thereby preventing the composite member 1 from warping after the bonding due to a difference in the coefficient of thermal expansion between the aluminum member 2 and the resin member 3.

EXAMPLES

Grain Size of the Blasting Media

First, the thickness of the oxide film of the aluminum member 2 was measured before the blasting step (S12) was performed. The aluminum oxide film was analyzed in the depth direction by using "Auger electron spectroscopy (AES)". An oxide and a metal component were simultaneously detected around an oxide/metal interface and thus were separated by a spectral synthesis method, so that the thickness of the oxide film was determined. The oxide film was 72 nm in thickness. Subsequently, the blasting step (S12) was performed using the blasting machine illustrated in FIGS. 3 to 5 and then the thickness of the oxide film of the aluminum member 2 was measured. In the case of a blasting media in which abrasive grains had a center particle size of 600 μm to 710 μm, an oxide film was 13 nm in thickness. In the case of a blasting media in which abrasive grains had a center particle size of 41 μm to 50 μm (a maximum particle size of 127 μm or less and a mean particle size of 57 μm±3 μm), an oxide film was 9 nm in thickness. Thus, it was confirmed that the oxide film of the surface 2a of the aluminum member 2 can be removed by using the blasting media of at least 710 μm.

Confirmation of a Surface State and Surface Roughness of the Aluminum Member when a Heating Temperature is Changed An aluminum plate (JIS: A5052) was used as the aluminum member. The surface hydroxylation step (S14) was performed on the aluminum member. As the surface hydroxylation step (S14), 10 ml of pure water was poured into an autoclave, an aluminum plate was placed, and then steam treatment was performed in a treatment time of 24 hours. Hereinafter, the treatment time of the steam treatment may be simply referred to as "treatment time." The heating temperatures of the steam treatment are 140° C., 180° C., and 220° C. A pressure in the autoclave was 0.5 MPa at a heating temperature of 140° C., was 1.0 MPa at a heating temperature of 180° C., and was 2.3 MPa at a heating temperature of 220° C. Surface roughness was then observed by using a field emission scanning electron microscope (FE-SEM).

Figure 12A:
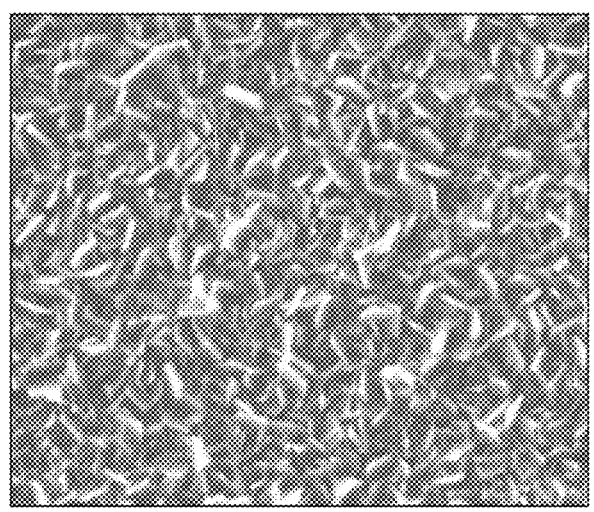
FIGS. 12A-12C indicate the surface observation results of an aluminum member.
Figure 12B:
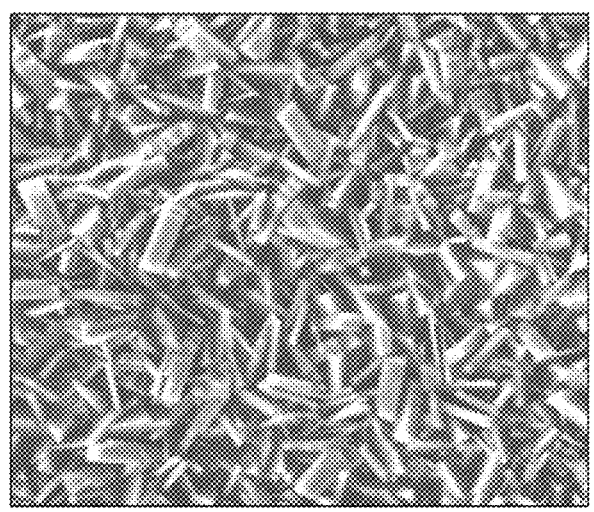
Figure 12C:
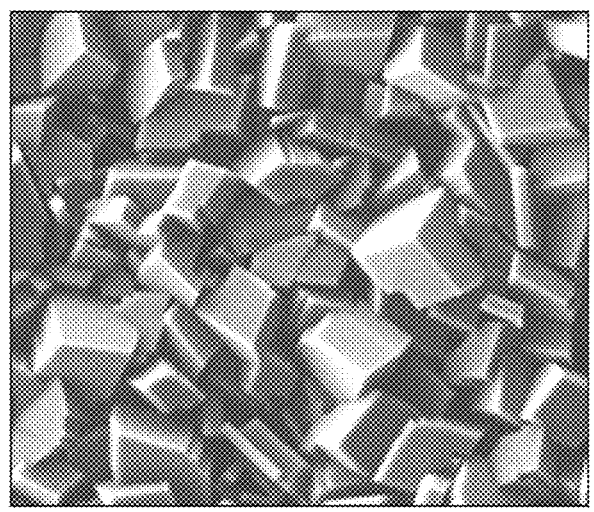

FIGS. 12A-12C indicate the surface observation results of the aluminum member. FIGS. 12A, 12B, and 12C indicate the surface observation results of the aluminum plate after the surface hydroxylation step (S14) at 140° C., 180° C., and 220° C. As indicated in FIGS. 12A, 12B, and 12C, it was confirmed that projections on the aluminum member considerably grew as a heating temperature rises in the surface hydroxylation step (S14).

Figure 13:
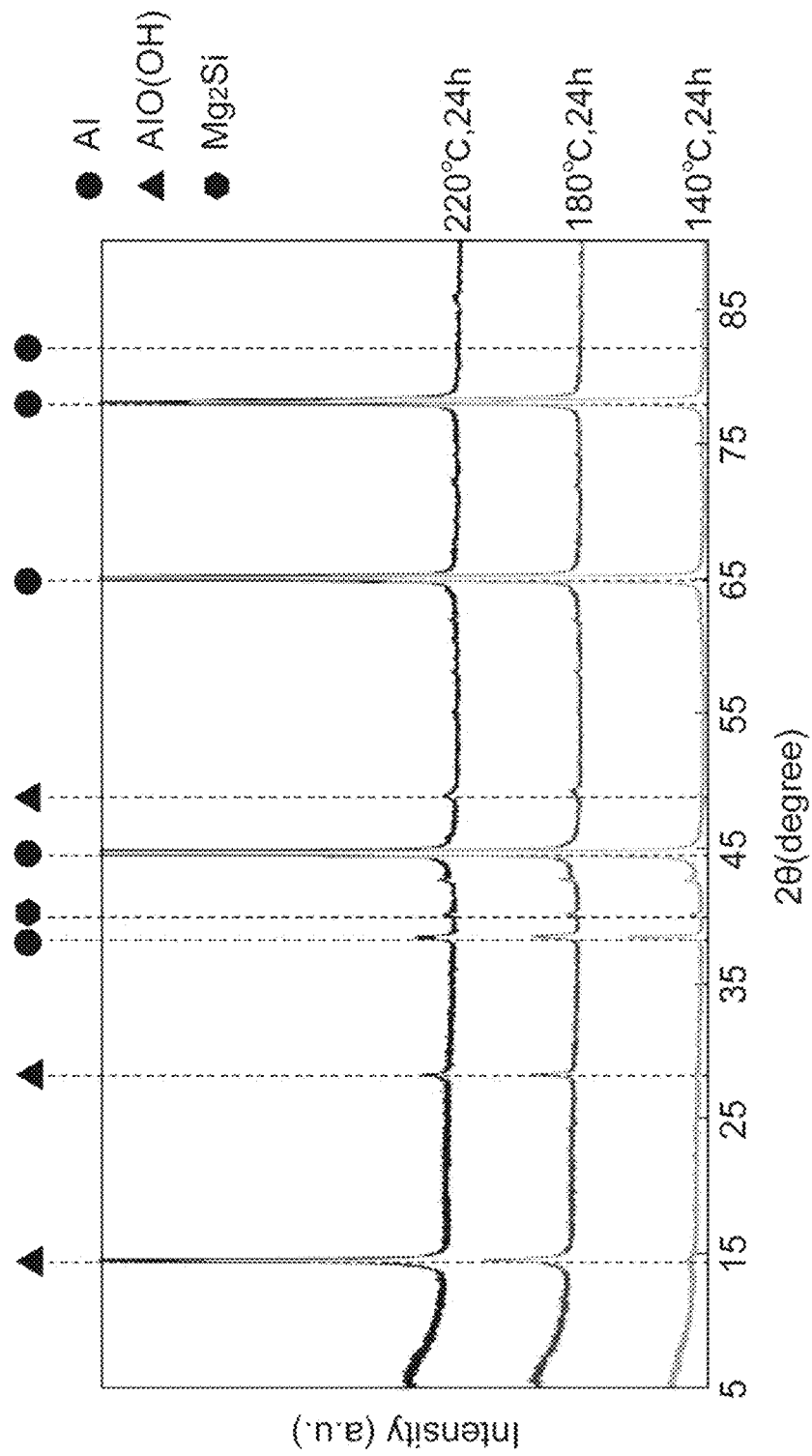
FIG. 13 indicates the analysis results of a crystal structure on the surface of the aluminum member.

FIG. 13 indicates the analysis results of a crystal structure on the surface of the aluminum member (X-ray diffraction measurement). In FIG. 13, the ordinate indicates diffracted X-ray intensity and the abscissa indicates a diffraction angle. As indicated in FIG. 13, the analysis results of the crystal structure on the aluminum member according to X-ray diffraction measurement show the diffraction peaks of aluminum (Al), aluminum hydroxide oxide (AlO(OH)), and magnesium silicide ($Mg_2Si$). This proved that the surface of the aluminum member contains aluminum, aluminum hydroxide oxide, and magnesium silicide. Furthermore, the diffraction peak of aluminum hydroxide oxide became clear as the heating temperature rises. Thus, it was confirmed that aluminum hydroxide oxide grows with the heating temperature.

As the surface roughness of the aluminum member, arithmetic mean roughness Ra determined by JIS B 0601 (1994) was measured. The arithmetic mean roughness Ra of the aluminum member was 0.42 μm at a heating temperature of 140° C., the arithmetic mean roughness Ra of the aluminum member was 0.56 μm at a heating temperature of 180° C., and the arithmetic mean roughness Ra of the aluminum member was 0.78 μm at a heating temperature of 220° C. The arithmetic mean roughness Ra of the aluminum member having not undergone the surface hydroxylation step (S14) was 0.39 μm. Thus, it was confirmed that the surface roughness (arithmetic mean roughness Ra) of the aluminum member increases with the heating temperature of the steam treatment. Moreover, it was confirmed that the surface roughness of the aluminum member increases when the heating temperature of the steam treatment is 140° C. or higher.

Confirmation of a Surface State of the Aluminum Member when a Treatment Time is Changed The blasting step (S12) was performed by using the blasting machine illustrated in FIGS. 3 to 5. An aluminum plate (JIS: A5052) was used as the aluminum member. The blasting media containing alumina with an abrasive-grain center particle size of 106 μm to 125 μm was used for blasting. The blast pressure was 1.0 MPa. After the blasting step, the surface was observed using a field emission scanning electron microscope (FE-SEM).

Subsequently, the surface hydroxylation step (S14) was performed. 10 ml of pure water was poured into the autoclave, the aluminum plate having undergone blasting was placed, and then steam treatment was performed at a heating temperature of 180° C. The treatment time was set at three hours, six hours, and 24 hours. A pressure in the autoclave was 1.0 MPa. The surface was then observed by using the field emission scanning electron microscope (FE-SEM).

Figure 14A:
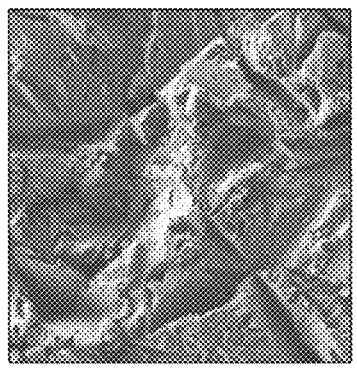
FIGS. 14A-14H indicate the surface analysis results of the aluminum member.
Figure 14B:
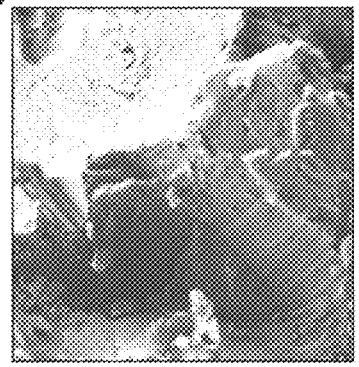
Figure 14C:
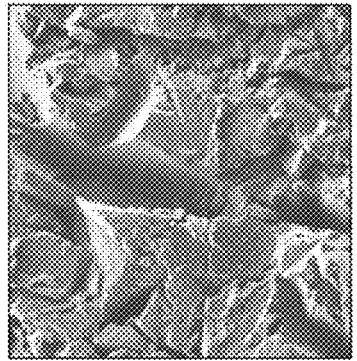
Figure 14D:
Figure 14E:
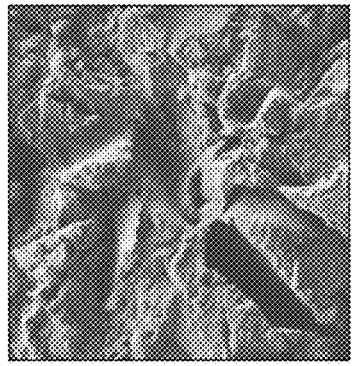
Figure 14F:
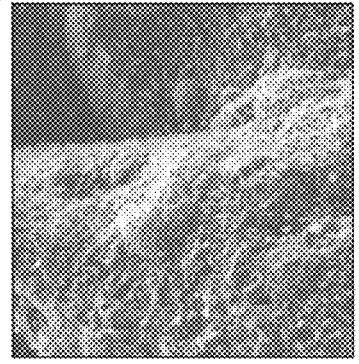
Figure 14G:
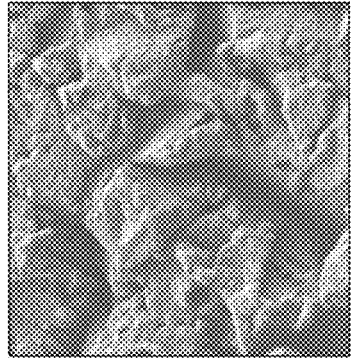
Figure 14H:
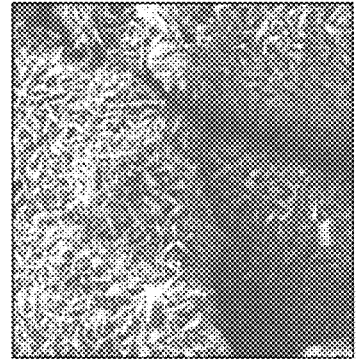

FIGS. 14A-14H indicate the surface observation results of the aluminum member. FIG. 14A indicates the surface observation result of the aluminum plate after the blasting step (S12). FIG. 14B indicates the surface observation result of the aluminum plate as an enlarged view of FIG. 14A. FIG. 14C indicates the surface observation result of the aluminum plate after the surface hydroxylation step (S14) was performed for three hours. FIG. 14D indicates the surface observation result of the aluminum plate as an enlarged view of FIG. 14C. FIG. 14E indicates the surface observation result of the aluminum plate after the surface hydroxylation step (S14) was performed for six hours. FIG. 14F indicates the surface observation result of the aluminum plate as an enlarged view of FIG. 14E. FIG. 14G indicates the surface observation result of the aluminum plate after the surface hydroxylation step (S14) was performed for 24 hours. FIG. 14H indicates the surface observation result of the aluminum plate as an enlarged view of FIG. 14G.

As indicated in FIGS. 14A and 14B, it was confirmed that the surface 2a of the aluminum member 2 had asperities and sharp projections after the blasting step (S12). In contrast, as indicated in FIGS. 14C to 14H, it was confirmed that the surface 2a of the aluminum member 2 was entirely rounded after the surface hydroxylation step (S14). As is evident from a comparison between FIGS. 14C, 14E, and 14G and FIGS. 14D, 14F, and 14H, it was confirmed that the surface of the aluminum plate had fine projections of 50 nm to 1000 nm after the surface hydroxylation step (S14).

Figure 15:
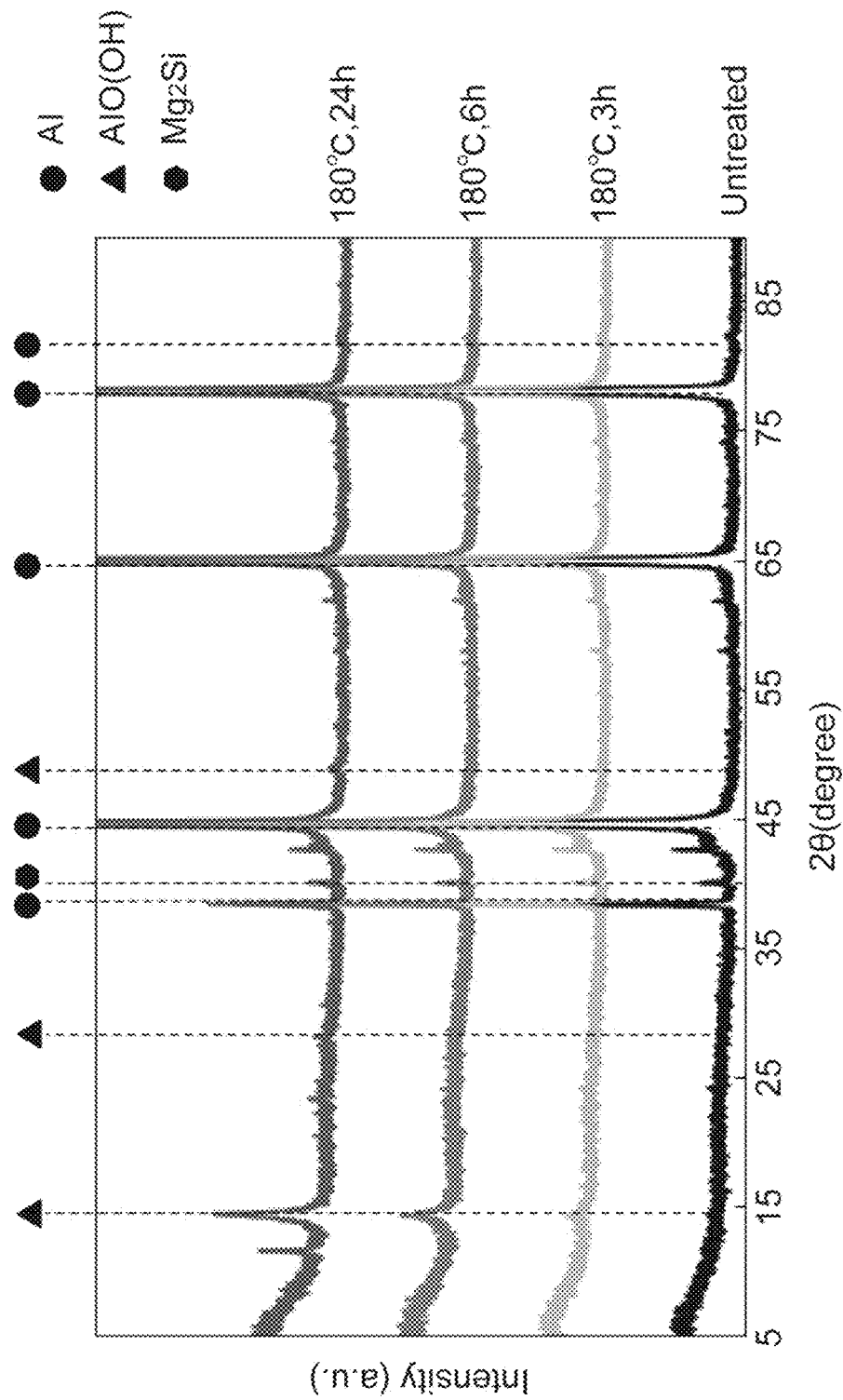
FIG. 15 indicates the analysis results of the crystal structure on the surface of the aluminum member.

FIG. 15 indicates the analysis results of a crystal structure on the surface of the aluminum member (X-ray diffraction measurement). In FIG. 15, the ordinate indicates diffracted X-ray intensity and the abscissa indicates a diffraction angle. As indicated in FIG. 15, the analysis results of the crystal structure on the aluminum member according to X-ray diffraction measurement show the diffraction peaks of aluminum (Al), aluminum hydroxide oxide (AlO(OH)), and magnesium silicide ($Mg_2Si$). This proved that the surface of the aluminum member contains aluminum, aluminum hydroxide oxide, and magnesium silicide. Furthermore, the diffraction peak of aluminum hydroxide oxide became clear as the treatment time increases. Thus, it was confirmed that aluminum hydroxide oxide grows with the treatment time.

Confirmation of Surface Roughness of the Aluminum Member when a Treatment Time is Changed An aluminum plate (JIS: A5052) was used as the aluminum member. The surface hydroxylation step (S14) was performed on the aluminum member. As the surface hydroxylation step (S14), 10 ml of pure water was poured into the autoclave, the aluminum plate having undergone blasting was placed, and then steam treatment was performed at a heating temperature of 180° C. The treatment time was set at two hours, 24 hours, and 36 hours. A pressure in the autoclave was 1.0 MPa.

Hence, the arithmetic mean roughness Ra of the aluminum member was 0.40 μm when the treatment time was two hours, the arithmetic mean roughness Ra of the aluminum member was 0.56 μm when the treatment time was 24 hours, and the arithmetic mean roughness Ra of the aluminum member was 0.59 μm when the treatment time was 36 hours. The arithmetic mean roughness Ra of the aluminum member having not undergone the surface hydroxylation step (S14) was 0.39 μm.

Thus, it was confirmed that the surface roughness (arithmetic mean roughness Ra) of the aluminum member increases with the treatment time of the steam treatment. Moreover, it was confirmed that the surface roughness of the aluminum member increases when the treatment time of the steam treatment is two hours or longer. Furthermore, a result comparison between the treatment time of 24 hours and the treatment time of 36 hours proved that a rate of increase in the surface roughness (arithmetic mean roughness Ra) of the aluminum member decreases when the treatment time exceeds 24 hours. Hence, it was confirmed that the surface roughness of the aluminum member efficiently increases when the treatment time of the steam treatment is 24 hours or shorter.

Confirmation of Shearing Strength

Examples 1 to 7 and comparative examples 1 to 6 were prepared to confirm shearing strength.

Examples 1 to 7

In example 1, the blasting step (S12) was performed by using the blasting machine illustrated in FIGS. 3 to 5. An aluminum plate (JIS: A5052) was used as the aluminum member. The surface hydroxylation step (S14) was performed. 10 ml of pure water was poured into the autoclave, the aluminum plate having undergone blasting was placed, and then steam treatment was performed at a heating temperature of 180° C. in a treatment time of two hours. Thereafter, the bonding step (S16) was performed. The resin member 3 was bonded to the aluminum member 2 by using the mold 20 illustrated in FIGS. 6 and 7. PPS (Polyphenylenesulfide) resin was used for the resin member 3. The resin member 3 was set to have dimensions: 10 mm (L)×45 mm (W)×3.0 mm (T). During the retention time of injection molding (the closing of the mold), the mold temperature was set at 220° C., the retention pressure was set at 5 MPa and the retention time was set at 300 s. An overlap of 5 mm was made between the aluminum member 2 and the resin member 3.

In example 2, the blasting step (S12) and the bonding step (S16) are identical to those of example 1. In the surface hydroxylation step (S14) of example 3, steam treatment was performed in a treatment time of three hours and other conditions are identical to those of example 1.

In example 3, the blasting step (S12) and the bonding step (S16) are identical to those of example 1. In the surface hydroxylation step (S14) of example 3, steam treatment was performed in a treatment time of six hours and other conditions are identical to those of example 1.

In example 4, the blasting step (S12) and the bonding step (S16) are identical to those of example 1. In the surface hydroxylation step (S14) of example 4, steam treatment was performed in a treatment time of 24 hours and other conditions are identical to those of example 1.

In example 5, an aluminum plate (JIS: A5052) having undergone the blasting step (S12) and the surface hydroxylation step (S14) as in example 3 was used as an aluminum member. The blasting media containing alumina with an abrasive-grain center particle size of 106 μm to 125 μm was used for blasting. The blast pressure was 0.4 MPa. At this point, the arithmetic mean inclination of the surface of the aluminum member was smaller than 0.17. The bonding step (S16) was performed as in example 1.

In example 6, the blasting step (S12) and the bonding step (S16) are identical to those of example 1. In the surface hydroxylation step (S14) of example 6, steam treatment was performed at a heating temperature of 140° C. and other conditions are identical to those of example 3.

In example 7, the blasting step (S12) and the bonding step (S16) are identical to those of example 1. In the surface hydroxylation step (S14) of example 7, steam treatment was performed at a heating temperature of 220° C. and other conditions are identical to those of example 3.

Comparative Examples 1 to 6

In comparative example 1, an aluminum plate (JIS: A5052) having not undergone the blasting step (S12) and the surface hydroxylation step (S14) was used as an aluminum member. Comparative example 1 is a member formed by bonding the aluminum member and the PPS resin.

In comparative example 2, an aluminum plate (JIS: A5052) having undergone the blasting step (S12) as in example 1 was used as an aluminum member without undergoing the surface hydroxylation step (S14). The bonding step (S16) was performed as in example 1.

In comparative example 3, an aluminum plate (JIS: A5052) having undergone the blasting step (S12) as in example 5 was used as an aluminum member without undergoing the surface hydroxylation step (S14). The bonding step (S16) was performed as in example 1.

In comparative example 4, an aluminum plate (JIS: A5052) having undergone the surface hydroxylation step (S14) was used as an aluminum member without undergoing the blasting step (S12). In the surface hydroxylation step (S14), steam treatment was performed at a heating temperature of 140° C. and other conditions are identical to those of example 4. The bonding step (S16) was performed as in example 1.

In comparative example 5, an aluminum plate (JIS: A5052) having undergone the surface hydroxylation step (S14) as in example 4 was used as an aluminum member without undergoing the blasting step (S12). The bonding step (S16) was performed as in example 1.

In comparative example 6, an aluminum plate (JIS: A5052) having undergone the surface hydroxylation step (S14) was used as an aluminum member without undergoing the blasting step (S12). In the surface hydroxylation step (S14), steam treatment was performed at a heating temperature of 220° C. and other conditions are identical to those of example 4. The bonding step (S16) was performed as in example 1.

Evaluation of Bonding Strength

The shearing strengths of examples 1 to 7 and comparative examples 1 to 6 prepared under the foregoing conditions were measured. An evaluation apparatus conducted measurements according to a testing method in conformity with ISO19095. FIG. 16 indicates the results of processing conditions and shearing strengths according to the examples. As indicated in FIG. 16, the shearing strength of example 1 was 21 MPa, the shearing strength of example 2 was 30 MPa, the shearing strength of example 3 was 38 MPa, the shearing strength of example 4 was 26 MPa, the shearing strength of example 5 was 13 MPa, the shearing strength of example 6 was 30 MPa, and the shearing strength of example 7 was 35 MPa. The shearing strength of comparative example 1 was 1 MPa, the shearing strength of comparative example 2 was 15 MPa, the shearing strength of comparative example 3 was 11 MPa, the shearing strength of comparative example 4 was 7.2 MPa, the shearing strength of comparative example 5 was 9.9 MPa, and the shearing strength of comparative example 6 was 3.9 MPa.

By comparing examples 1 to 4 with comparative examples 2 and 3, it was confirmed that the shearing strength was remarkably improved by performing the blasting step (S12) and the surface hydroxylation step (S14) as compared with the execution of the blasting step (S12) alone. Moreover, by comparing example 4 with comparative examples 4 to 6, it was confirmed that the shearing strength was remarkably improved by performing the blasting step (S12) and the surface hydroxylation step (S14) as compared with the execution of the surface hydroxylation step (S14) alone.

By comparing comparative example 1 with comparative examples 2 and 3, it was confirmed that the shearing strength was improved to a certain extent by performing the blasting step (S12) alone as compared with the absence of the blasting step (S12) and the surface hydroxylation step (S14). Moreover, by comparing comparative example 1 with comparative examples 4 to 6, it was confirmed that the shearing strength was improved to a certain extent by performing the surface hydroxylation step (S14) alone as compared with the absence of the blasting step (S12) and the surface hydroxylation step (S14).

Thus, it was confirmed that the blasting step (S12) and the surface hydroxylation step (S14) are performed in combination and thus achieve the effect of improving the shearing strength as in the execution of the blasting step (S12) alone and in the execution of the surface hydroxylation step alone (S14). Furthermore, as a synergistic effect of the combination of the blasting step (S12) and the surface hydroxylation step (S14) (example 4), it was confirmed that the obtained shearing strength is larger than the total value of shearing strength obtained by simply performing the blasting step (S12) alone (comparative example 2) and shearing strength obtained by performing the surface hydroxylation step (S14) alone (comparative example 5).

Moreover, by comparing example 3 with example 5 or comparing comparative example 2 with comparative example 3, it was confirmed that the shearing strength was remarkably improved by performing blasting such that the arithmetic mean inclination of the surface of the aluminum member ranges from 0.17 to 0.50 in the blasting step (S12).

By comparing example 3 with examples 6 and 7 or comparing comparative example 5 with comparative examples 4 and 6, it was confirmed that the shearing strength was improved by setting a heating temperature at 140° C. to 220° C. in the surface hydroxylation step (S14). Furthermore, it was confirmed that the shearing strength was remarkably improved by setting a heating temperature at about 180° C. in the surface hydroxylation step (S14).

By comparing example 3 with examples 1, 2, and 4, it was confirmed that the shearing strength was improved by setting a treatment time at two to 24 hours in the surface hydroxylation step (S14). Furthermore, it was confirmed that the shearing strength was remarkably improved by setting a treatment time at about six hours in the surface hydroxylation step (S14).

As has been discussed, in the heating-temperature range from 140° C. to 220° C. in the surface hydroxylation step (S14), the shearing strength had a maximum value and reached a peak value when the heating temperature of the surface hydroxylation step (S14) was 180° C. Furthermore, in the treatment-time range from two to 24 hours in the surface hydroxylation step (S14), the shearing strength had the maximum value and reached the peak value when the treatment time of the surface hydroxylation step (S14) was six hours.

If a heating temperature in the surface hydroxylation step (S14) ranges from 140° C. to 180° C., the shearing strength increases like the increasing trend of surface roughness. It is estimated that a large amount of aluminum hydroxide is formed on the surface (contact layer) of the aluminum member after a certain treatment time and thus the number of asperities on the surface of the aluminum member increases. It is estimated that the increase in the number of asperities formed on the surface of the aluminum member further contributes to an anchor effect appearing between the aluminum member and the resin member and thus the shearing strength increases with a heating temperature ranging from 140° C. to 180° C.

If a heating temperature in the surface hydroxylation step (S14) ranges from 180° C. to 220° C., the shearing strength decreases with the increasing trend of surface roughness. It is estimated that aluminum hydroxide formed on the surface of the aluminum member is grown and deposited after a certain treatment time and thus the number of asperities on the surface of the aluminum member decreases. It is estimated that the decrease in the number of asperities formed on the surface of the aluminum member causes a reduced contribution to an anchor effect appearing between the aluminum member and the resin member and thus the shearing strength decreases with a heating temperature ranging from 180° C. to 220° C. Hence, it is estimated that the shearing strength peaks at about 180° C. in the heating-temperature range of 140° C. to 220° C.

If a treatment time in the surface hydroxylation step (S14) ranges from two to six hours, the shearing strength increases like the increasing trend of surface roughness. It is estimated that a large amount of aluminum hydroxide is formed on the surface (contact layer) of the aluminum member after the elapse of the treatment time and thus the number of asperities on the surface of the aluminum member increases. It is estimated that the increase in the number of asperities formed on the surface of the aluminum member further contributes to an anchor effect appearing between the aluminum member and the resin member and thus the shearing strength increases as a treatment time is longer ranging from two to six hours.

If a treatment time in the surface hydroxylation step (S14) ranges from six to 24 hours, the shearing strength decreases with the increasing trend of surface roughness. It is estimated that aluminum hydroxide formed on the surface of the aluminum member is grown and deposited after a certain treatment time (in this case, six hours) and thus the number of asperities on the surface of the aluminum member decreases. It is estimated that the decrease in the number of asperities formed on the surface of the aluminum member causes a reduced contribution to an anchor effect appearing between the aluminum member and the resin member and thus the shearing strength decreases with a treatment time ranging from six to 24 hours. Hence, it is estimated that the shearing strength peaks at about six hours in the treatment-time range of six to 24 hours.

Confirmation of Corrosion Resistance

Example 8 and comparative example 7 were prepared to confirm corrosion resistance.

Example 8

In example 8, the blasting step (S12), the surface hydroxylation step (S14), and the bonding step (S16) as in example 4 were performed to form the composite member.

Comparative Example 7

In comparative example 7, an aluminum plate (JIS: A5052) having not undergone the blasting step (S12) and the surface hydroxylation step (S14) was used as an aluminum member. Comparative example 7 is a member formed by bonding the aluminum member and PPS resin.

Evaluation of Corrosion Resistance

Regarding the corrosion resistance of example 8 and comparative example 7 prepared under the foregoing conditions, a NaCl solution was used to measure a current density. The composite member of example 8 and the composite member of comparative example 7 are immersed into a NaCl solution with a concentration of 5 wt % (weight percent) at room temperature and then a corrosion current density is calculated according to a polarization resistance method. Consequently, the corrosion current density of the composite member of example 8 is about one hundredth that of the composite member of comparative example 7. It is estimated that an amorphous layer having the function of passivation is formed on the surface of the aluminum member in steam treatment in the surface hydroxylation step (S14) and thus a current density decreases on the surface of the aluminum member.

Confirmation of Hardness

Examples 9 and 10 and comparative example 8 were prepared to confirm hardness.

Examples 9 and 10

In example 9, the blasting step (S12) was performed by using the blasting machine illustrated in FIGS. 3 to 5. An aluminum plate (JIS: A5052) was used as the aluminum member. The blasting media containing alumina with an abrasive-grain center particle size of 106 μm to 125 μm was used for blasting. The blast pressure was 1.0 MPa. At this point, the arithmetic mean inclination of the surface of the aluminum member was 0.17 to 0.50. Subsequently, the surface hydroxylation step (S14) was performed. 10 ml of pure water was poured into the autoclave, the aluminum plate having undergone blasting was placed, and then steam treatment was performed at a heating temperature of 180° C. in a treatment time of 30 minutes. Thereafter, the bonding step (S16) was performed. The resin member 3 was bonded to the aluminum member 2 by using the mold 20 illustrated in FIGS. 6 and 7, so that the composite member was formed. PPS (Polyphenylenesulfide) resin was used for the resin member 3. The resin member 3 was set to have dimensions: 10 mm (L)×45 mm (W)×3.0 mm (T). During the retention time of injection molding (the closing of the mold), the mold temperature was set at 220° C., the retention pressure was set at 5 MPa and the retention time was set at 300 s. An overlap of 5 mm was made between the aluminum member 2 and the resin member 3.

In example 10, the blasting step (S12) and the bonding step (S16) are identical to those of example 9. In the surface hydroxylation step (S14) of example 10, steam treatment was performed in a treatment time of 60 minutes and other conditions are identical to those of example 9.

Comparative Example 8

In comparative example 8, an aluminum plate (JIS: A5052) having not undergone the blasting step (S12) and the surface hydroxylation step (S14) was used as an aluminum member. Comparative example 8 is a member formed by bonding the aluminum member and PPS resin.

Evaluation of Hardness

Regarding the hardness of the composite members of examples 9 and 10 and the composite member of comparative example 8 that were prepared under the foregoing conditions, hardness tests compliant with a Vickers hardness test (JIS Z 2244/ISO 6507-1) were conducted to measure Vickers hardness. At this point, a test force was 0.05 kgf/mm². FIG. 17 indicates the measurement results of the Vickers hardness of the aluminum member. As shown in FIG. 17, the Vickers hardness of example 9 was 165 HV0.05, the Vickers hardness of example 10 was 178 HV0.05, and the Vickers hardness of comparative example 8 was 80 HV0.05. According to the result, it was confirmed that the Vickers hardness of the composite members of examples 9 and is at least twice that of the composite member of comparative example 8. It is estimated that a deposit layer is formed on the surface of the aluminum member in steam treatment in the surface hydroxylation step (S14) and thus the Vickers hardness increases on the surface of the aluminum member.

REFERENCE SIGNS LIST

1 . . . composite member, 2 . . . aluminum member, 2*a* . . . surface, 2*b* . . . asperities, 2*c* . . . base material, 2*d* . . . deposit layer, 2*e* . . . amorphous layer, 2*f* . . . contact layer, 3 . . . resin member, 10 . . . blasting machine, 11 . . . blast chamber, 12 . . . blast nozzle, 13 . . . storage tank, 14 . . . pressure chamber, 15 . . . compressed-air feeder, 16 . . . fixed-quantity feeding part, 17 . . . connecting pipe, 18 . . . work table, 19 . . . control unit, . . . mold, 21 . . . mold body

What is claimed is:

1. A method of manufacturing a composite member including an aluminum member and a resin member that are bonded to each other, the method comprising:
   performing a blasting on a surface of the aluminum member;
   modifying the surface of the aluminum member into aluminum hydroxide, the modifying including causing the surface of the aluminum member having undergone blasting to react with water vapor by applying a pressure exceeding atmospheric pressure; and
   directly bonding the resin member to the surface of the aluminum member modified to aluminum hydroxide,
   wherein the modifying includes causing the surface of the aluminum member having undergone blasting to react with water vapor by applying heat at a temperature of at least 140° C.,
   wherein the modifying includes causing the surface of the aluminum member having undergone blasting to react with water vapor in a processing time of 6 to 24 hours, and
   wherein the resin member contains a conductive filler and has conductivity.

2. The method according to claim 1, wherein the aluminum hydroxide contains at least one selected from the group consisting of diaspore, boehmite, pseudo-boehmite, bayerite, nostrandite, gibbsite, and doyleite.

3. The method according to claim 1, wherein abrasive grains used in the performing blasting have a particle size of 30 μm to 710 μm.

4. The method according to claim 2, wherein abrasive grains used in the performing blasting have a particle size of 30 μm to 710 μm.

* * * * *